United States Patent [19]

Olson et al.

[11] Patent Number: 4,901,245
[45] Date of Patent: Feb. 13, 1990

[54] NONINTRUSIVE ACOUSTIC LIQUID LEVEL SENSOR

[75] Inventors: Rodney S. Olson, Chiloquin; Edward L. Christensen, Klamath Falls, both of Oreg.

[73] Assignee: Moore Technologies, Inc., Klamath Falls, Oreg.

[21] Appl. No.: 127,265

[22] Filed: Dec. 1, 1987

[51] Int. Cl.$^4$ ............................................. G01F 23/00
[52] U.S. Cl. .................................. 364/509; 73/290 V; 340/621; 367/908
[58] Field of Search ................. 73/149, 290 V, 861.26; 340/621; 364/509, 562; 367/908

[56] References Cited

U.S. PATENT DOCUMENTS

| | | | |
|---|---|---|---|
| 4,210,969 | 7/1980 | Massa | 367/908 X |
| 4,228,530 | 10/1980 | Bergey | 73/290 V X |
| 4,248,087 | 2/1981 | Dennis et al. | 340/621 X |
| 4,470,299 | 9/1984 | Soltz | 367/908 X |
| 4,487,065 | 12/1984 | Carlin et al. | 73/290 V |
| 4,580,448 | 4/1986 | Skrgatic | 367/908 X |
| 4,675,854 | 6/1987 | Lau | 367/908 |
| 4,715,226 | 12/1987 | Dorr | 73/149 X |
| 4,770,038 | 9/1988 | Zuckerwar et al. | 367/908 X |
| 4,821,569 | 4/1989 | Soltz | 367/908 X |

OTHER PUBLICATIONS

Instruction Manual–Model 936/946 etc; 1985, Introtek International Inc., pp. 1-6.
Magnetrol Introduces the . . . Echotel III 902 Series Ultrasonic Level Transmitter, 1986, 2 pgs., Magnetrol International.

Primary Examiner—Parshotam S. Lall
Assistant Examiner—Edward R. Cosimano
Attorney, Agent, or Firm—Christie, Parker & Hale

[57] ABSTRACT

A non-intrusive acoustic sensor system for detecting and displaying the location of the level of a liquid in a tank uses a piezoelectric transceiver mounted to a bottom exterior location on the tank. The transceiver is an element of a driving and signal processing circuit which also includes a readout device for displaying liquid level location in selected terms. The system circuitry includes a microprocessor programmed to enable the velocity of sound in a liquid in the tank to be determined by the system at the site of use from a single distance measurement descriptive of the usage situation. The system automatically selects and uses the transceiver acoustic emission frequency which is best for the tank and liquid combination of interest at any time. The system, in a dual-transceiver configuration described, determines and uses speed of sound in the liquid as it in fact exists at any time. The system also rejects echo signals which are determined to described locations in the tank other than the liquid surface. A plurality of liquid levels can be defined at which control or alarm events are to occur.

44 Claims, 22 Drawing Sheets

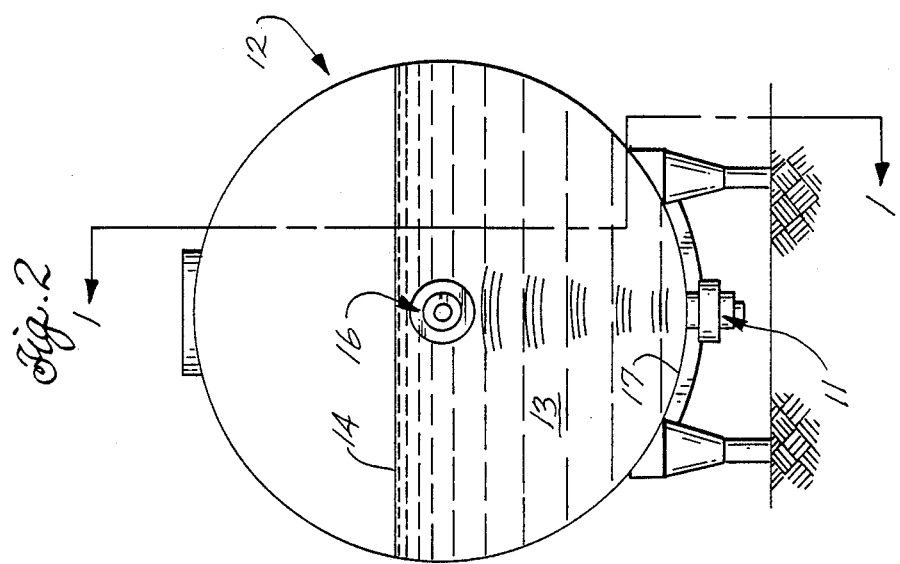
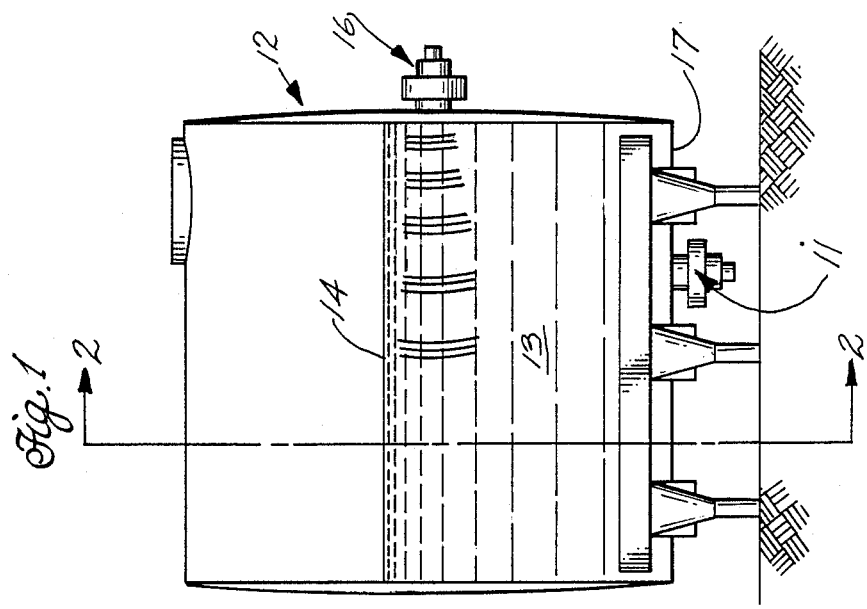

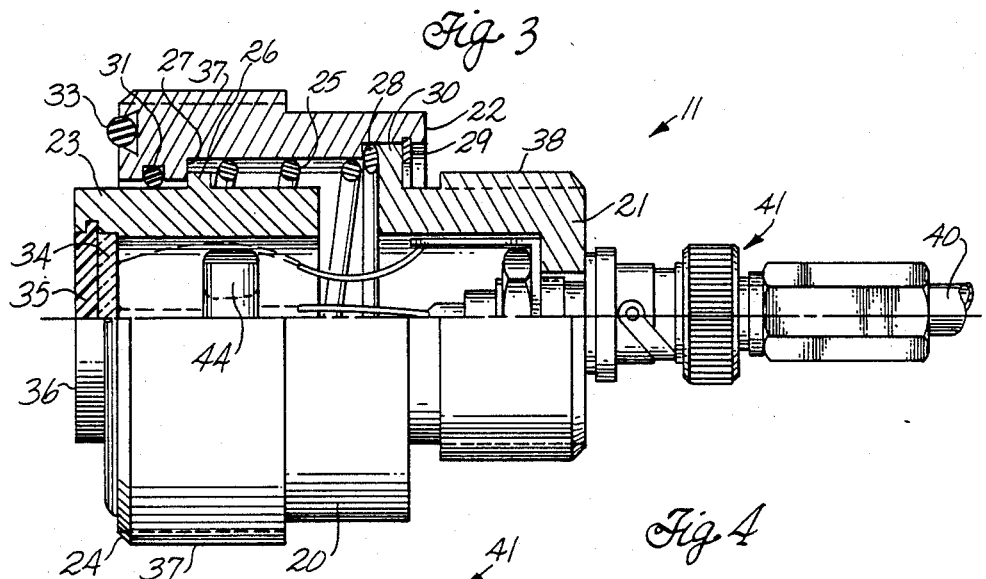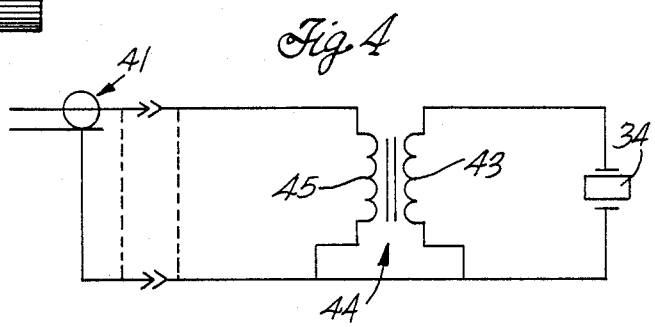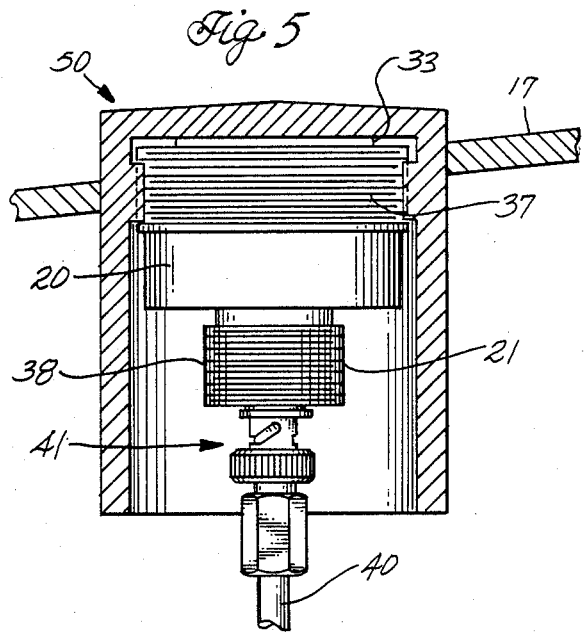

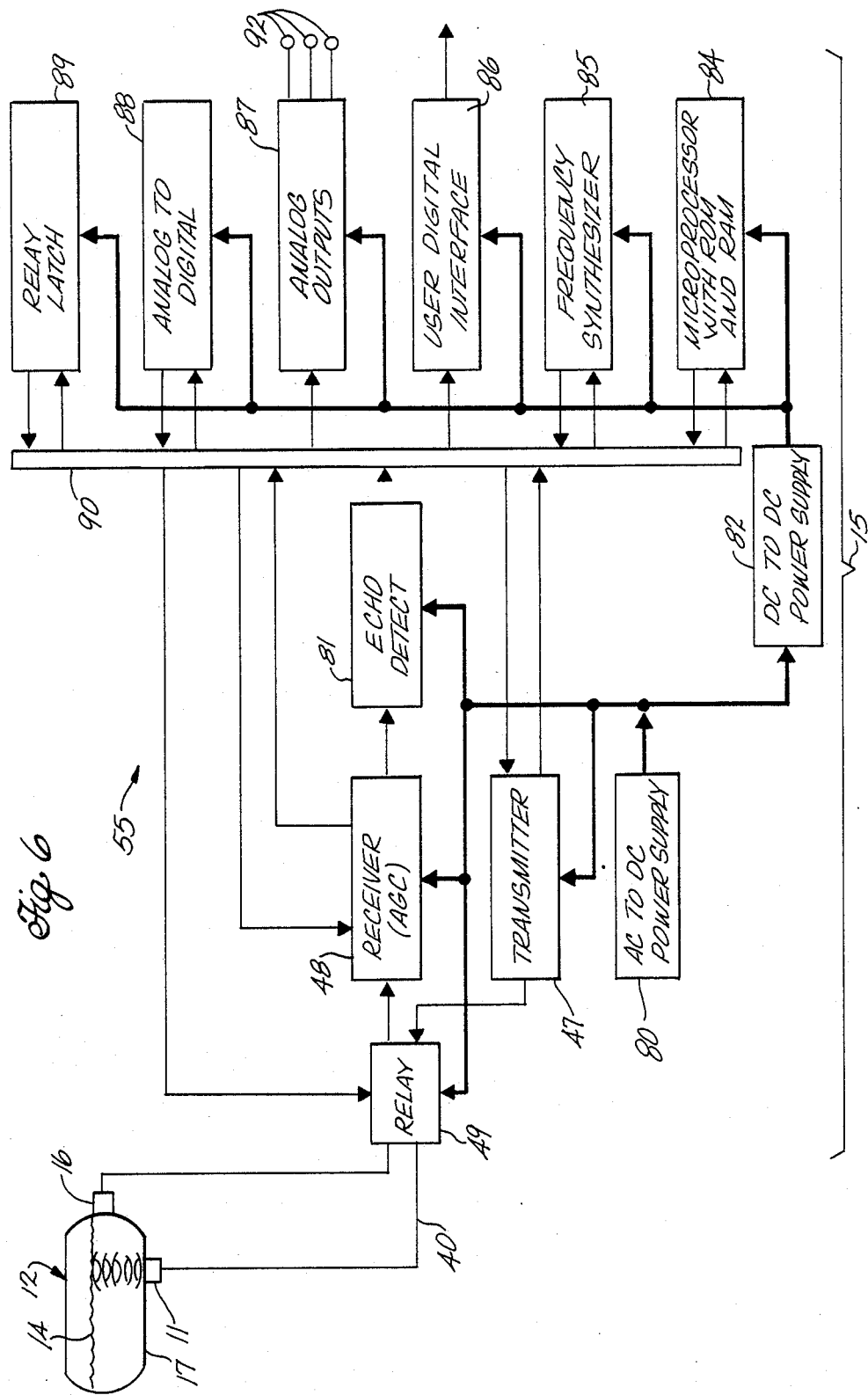

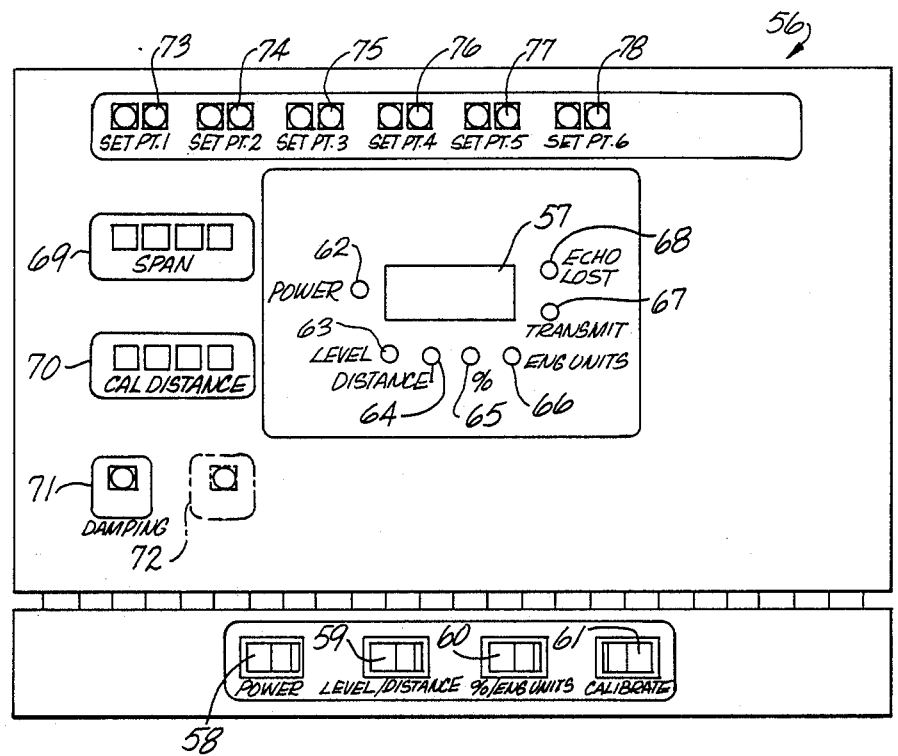

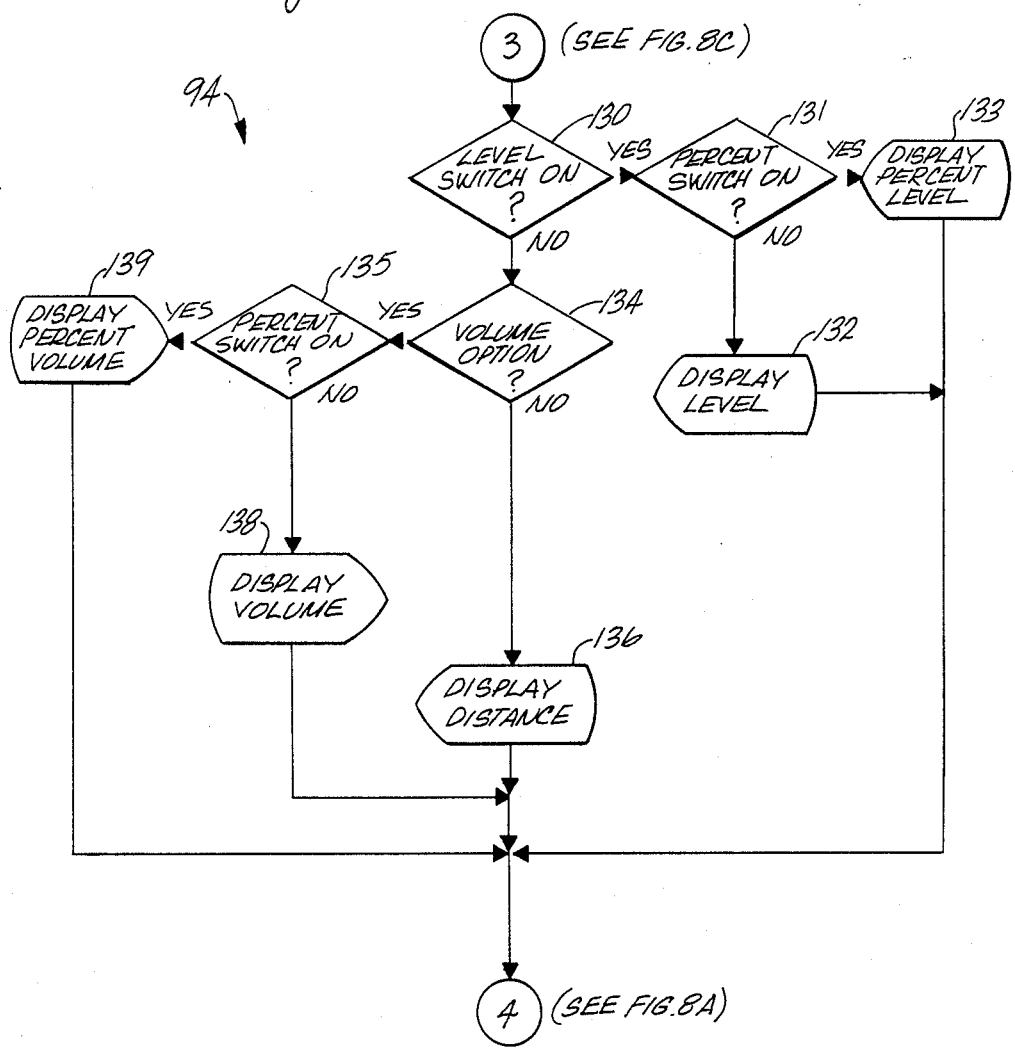

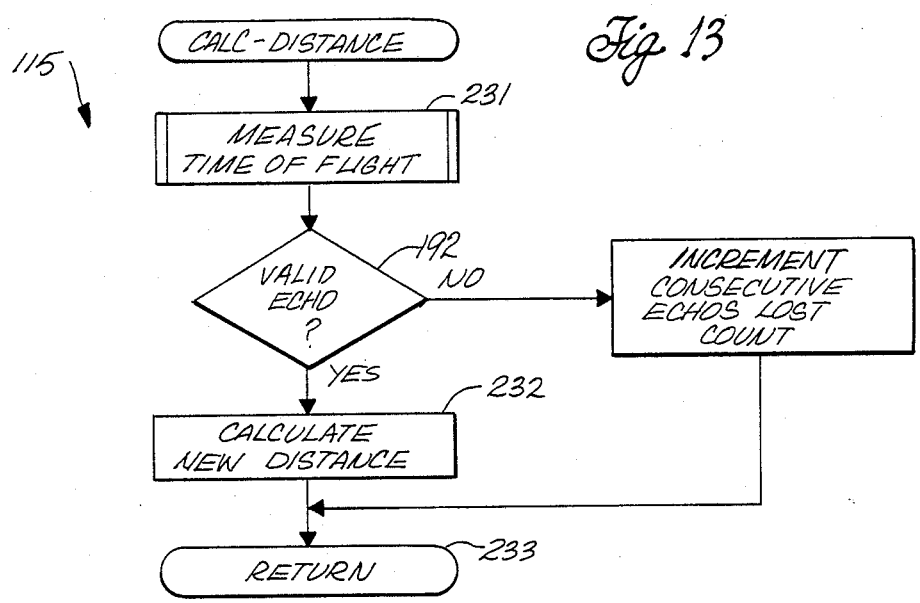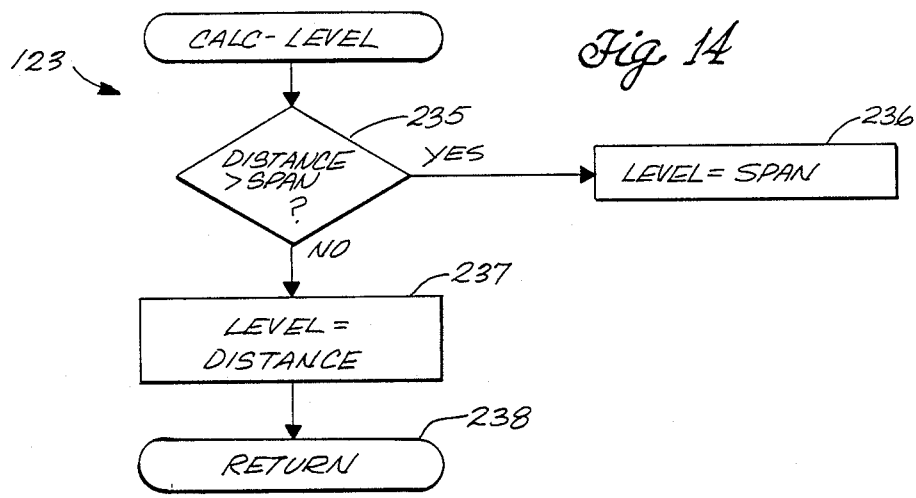

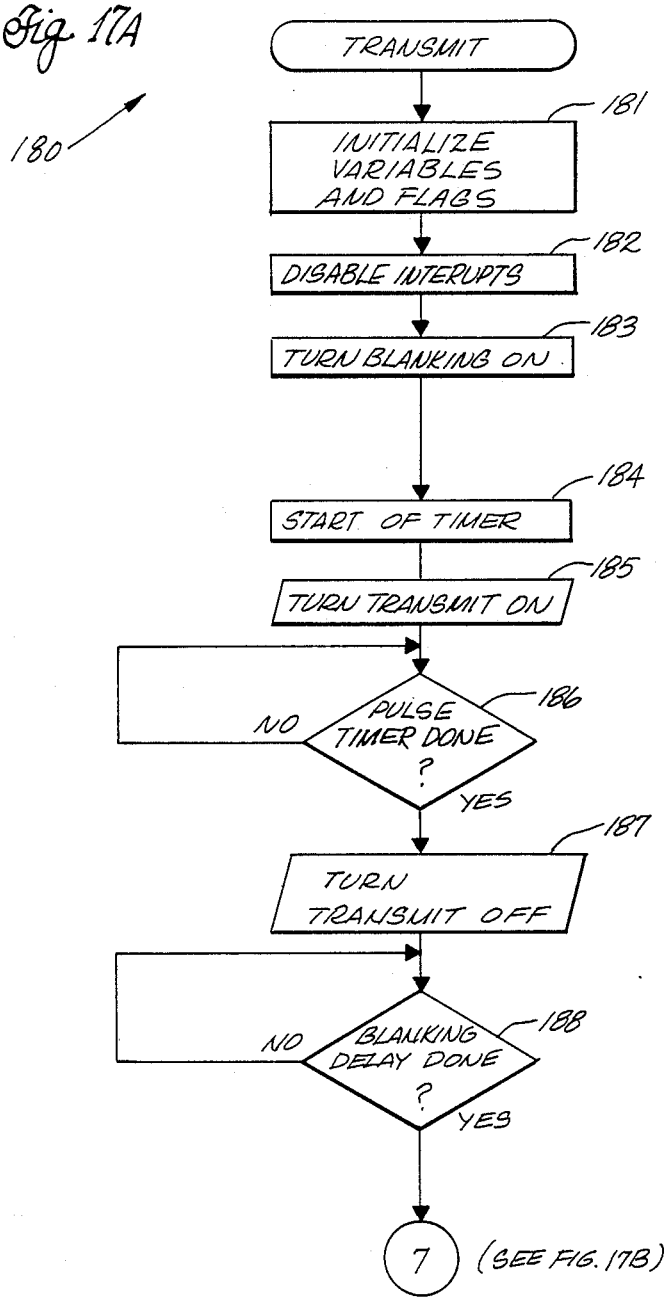

NONINTRUSIVE ACOUSTIC LIQUID LEVEL SENSOR

FIELD OF THE INVENTION

This invention pertains to instrument transducer systems. More particularly, it pertains to a system for measuring the location of the level of a liquid in a tank by use of an acoustic energy transceiver mountable to a bottom exterior surface of the tank.

BACKGROUND OF THE INVENTION

Review of the Prior Art

Several different forms of devices are known for measuring the location of the level of a liquid in a tank or other vessel. They are used as control or data gathering mechanisms in diverse industrial, laboratory and other applications. They include various kinds of float operated mechanisms, capacitative mechanisms, resistance mechanisms, and acoustic mechanisms, all of which require the presence in the tank of at least part of the structure of the mechanism.

There are many industrial processes in which the level of a liquid in a tank or vessel must be measured but in which it is undesirable for the level measurement equipment to be in the tank itself. The manufacture of pharmaceuticals and food products are examples of such processes; concerns about purity of process liquids outweigh the convenience of level measurement devices in tanks for such instances. In other instances, the process liquid may be corrosive and hostile to level sensing or measuring devices. As a result, costly and often unreliable systems for measuring liquid levels from the exterior of a tank must be used, or a series of devices must be used at different vertical stations along the tank exterior. Gamma ray devices, for example, are costly and are subject to frequent inspections by regulatory agencies; they can not be used in food manufacturing processes. Doppler effect nonintrusive level sensors must be used in groups along the exterior of a tank, because each device provides information that a liquid is or is not present inside the tank at the level where the device is mounted to the outside of the tank.

Intrusive, i.e., inside the tank, acoustic liquid level sensing devices are well known, reliable and effective in many applications. Acoustic level sensors use an acoustic energy transceiver inside a tank to transmit a pulsed sound signal vertically toward a liquid surface and to generate an echo signal upon receipt of an echo or reflection of the transmitted sound pulse from the liquid surface. The elapsed time between transmission of the sound pulse and receipt of the echo is measured and halved; that information, coupled with knowledge of the velocity of sound between the transceiver and the liquid surface, provides a measurement of the distance from the transceiver to the liquid surface. The transceiver can be located in the liquid below the surface to direct the transmitted sound pulse upwardly, or the transceiver can be located above the liquid surface to radiate sound pulses downwardly through air or some other fluid above the liquid surface.

The velocity of sound in water at different temperatures is known. The velocity of sound in a few other liquids is also known. For most liquids, however, knowledge of the velocity of sound through the liquid is either limited or non-existent. For that reason, target-type intrusive acoustic level sensors have been developed. They include a target member spaced a known short distance from the sound pulse source toward the liquid surface. As a sound pulse is generated, a portion of the radiated sound pulse is reflected by the target back to the source which then operates as an echo receiver; the remainder of the radiated pulse passes on to the liquid surface where it is reflected back to the source operating as a receiver. The time between pulse generation and target echo receipt is measured for a known distance, thereby providing information about the velocity of sound in the intervening medium, and that velocity figure is applied to the echo from the liquid surface to describe the distance from the sound source to the liquid surface. However, a target-type level sensor cannot be used from outside a liquid storage tank because the target must be inside the tank to provide useful information about the velocity of sound in the medium between the sound source and the liquid surface.

A nonintrusive acoustic liquid level sensor for use on the bottom of a tank has recently been commercially introduced by Magnetrol International. It is understood that that sensor has an operating frequency which is preset by the manufacturer for a specified liquid of interest, and the signal processing circuitry associated with that sensor is defined by the manufacturer for the velocity of sound in that liquid of interest as specified by the customer or user. The customer must also specify to the manufacturer the thickness of the tank wall to which the sensor will be mounted and the material of the tank wall. That sensor, therefore, is effectively custom made and is usable by a customer only with the specified tank and liquid unless the sensor is returned to the manufacturer for resetting to different use conditions. That sensor cannot be stocked by a distributor for sale to any of several customers, nor can a user efficiently change the location of use or liquid of interest as may be desired.

It is apparent that a need exits for a versatile, reliable, effective and relatively uncomplicated non-intrusive liquid level sensor which can be used with tanks having a wide range of wall thicknesses and materials and which is adjustable, if needed, by a user to suit various tank and liquid usage situations. Such a liquid level sensor can be used with virtually any liquid of interest and a wide range of tanks. It can be manufactured as a standard product, rather than as a custom product, with significant reductions in manufacturing cost. Such a sensor can be inventoried and marketed more effectively, thereby further reducing costs to users and better serving the needs of users. Such a sensor, because prior knowledge of sound velocity in a liquid of interest is not required, can be used on test or on-approval bases by prospective users to ascertain sensor suitability for specific needs, and can also be used with tanks which contain different liquids at different times.

SUMMARY OF THE INVENTION

This invention addresses and fills the need identified above. It does so by providing a versatile, reliable, effective, efficient and relatively uncomplicated nonintrusive liquid level sensor system which can be used with a wide range of tank wall thicknesses and wall materials and with substantially any liquid of interest. The sensor assembly of the system is readily mountable to an exterior bottom surface of a tank. The system is easily adjusted by a user to contain readily obtained information from which the system itself determines pertinent sound velocity values; in one embodiment of the system, the determination of pertinent sound velocity is essentially fully automated. The system has the feature of being able to adjust itself to optimum operating conditions for any particular usage situation. The user can readily and efficiently alter the liquid in the tank without concern about the capacity of the system to accommodate such changes.

Generally speaking, in terms of structure of the invention, this invention provides apparatus for measuring in selected terms the level of a liquid in a tank from a location on an outside bottom surface of the tank. The apparatus comprises an energy transceiving means, driving means for the transceiving means, signal processing means, and tuning means. The transceiving means is mountable to the bottom of the tank for transmitting an emitted signal in an energy form which is reflectable by a liquid surface in the tank and in a direction essentially vertically through the tank bottom wall and through liquid in the tank to the liquid surface. The transceiving means also is operable for receiving a reflection of transmitted energy from the liquid surface and for generating a reflection signal in response to receipt of a reflection. The driving means is operable for driving the transceiving means to transmit an emitted signal. The signal processing means is operable for processing a reflection signal to create information descriptive, in the selected terms, of the location of the liquid surface in the tank. The tuning means is operable in response to operation of the signal processing means for adjusting a selected property of the emitted signal to an optimum value for the liquid in the tank.

Preferably the form of energy used to define an emitted signal is acoustic energy. The selected property of the emitted signal preferably is the frequency of an acoustic emitted signal. The tuning means automatically selects and maintains that acoustic frequency which the tuning means determines to be best for the liquid in the tank at any time. The transceiving means preferably is a piezoelectric transducer which both sends emitted signals and generates reflection signals in response to its receipt of emitted signal reflections from the liquid surface.

In one form of the invention, the usage-specific data needed to enable the system to measure liquid level location is a manually measured level value; information about that measured value is enterable by a user at the system usage site into the signal processor only once for a liquid of interest, and thereafter the system needs no further manual adjustment, which is easily made, until the user changes the liquid in the tank. In another form of the invention, a second transducer on the side of the tank provides information about sound velocity automatically for any liquid in the tank by measuring the time needed for an emitted signal to travel from that transducer to the far side wall of the tank (a known distance) and back to the transducer; the known distance across the tank is entered into the signal processor of the system by the user at the site of use.

DESCRIPTION OF THE DRAWINGS

The above-mentioned and other features and advantages of this invention are more fully set forth in the following description of the presently preferred and other embodiments of the invention. That description is presented with reference to the accompanying drawings, wherein:

FIG. 1 is a longitudinal cross-sectional elevation view of a liquid tank equipped with a nonintrusive acoustic level sensing system according to a presently preferred embodiment of this invention;

FIG. 2 is a cross-section view taken along line 2—2 in FIG. 1;

FIG. 3 is a fragmentary longitudinal cross-sectional elevation view of a presently preferred transceiver for the sensing system shown in FIG. 1;

FIG. 4 is an electrical schematic diagram of the transceiver shown in FIG. 3;

FIG. 5 is a cross-sectional fragmentary elevation view of a mounting of the transceiver of FIG. 3 in a manner different from the mounting shown in FIGS. 1 and 2;

FIG. 6 is a block diagram relating the main components of a control and operating system with which the transceiver is used in the level sensing system;

FIG. 7 is an elevation view of a control panel of a control and operating system for the sensing system shown in FIG. 1;

FIGS. 8A through 8D are interconnected portions of an overall flow chart which describes the functions, and relations between functions, performed during operation of a principal aspect of the control and operating system, such aspect being called the XLS.COS program;

FIGS. 13 through 16 respectively, are flow charts of DISTANCE, LEVEL, VOLUME, and PERCENT calculations operations sequences subordinate to those shown in FIGS. 8A through 8D;

FIGS. 17A and 17B comprise a flow chart descriptive of a TRANSMIT operations sequence which is also subordinate to the sequence shown in FIGS. 8A through 8D;

DESCRIPTION OF THE ILLUSTRATED EMBODIMENTS

Figure 8A:
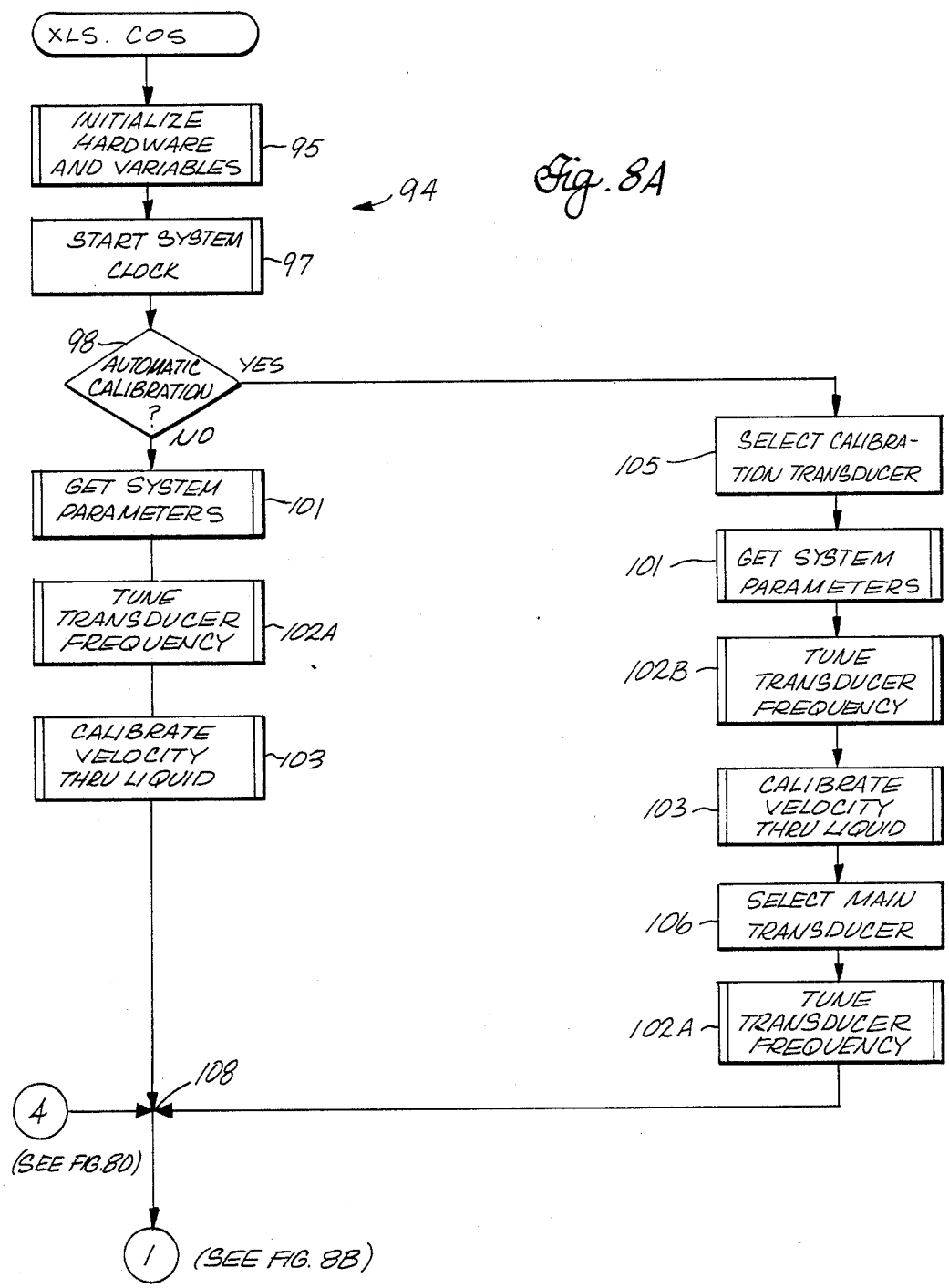

As shown generally in FIG. 6, a liquid level sensing system 10 according to this invention includes a signal transceiver 11 (also called a transducer) physically connected to the exterior of a tank 12 in which is a liquid 13 having a surface 14. It is the level of surface 14 in tank 12 which is to be sensed and suitably represented generally by system 10. The sensing system also includes, either at tank 12 or at a suitable different location, a control and operating system (COS) 55 of which the circuit 15, represented by the block diagram of FIG. 6, is a part. Other aspects of the COS are provided by data, commands, and instruction sequences which are permanently or transiently stored in memory elements of circuit 15, and which are used from time to time under the control of a principal operating sequence of the system COS to cause the structural components of sensing system 10 to cooperate and to produce the benefits and advantages of this invention.

A transducer is a device or mechanism which receives energy in one form and which sends on energy in a different form in a way which is related to the energy received. A loudspeaker is a transducer which receives energy in electrical form and sends on or emits energy in an acoustic form as sound. The sound emitted by a loudspeaker is related to the electrical energy received by it. A microphone is a transducer which receives acoustic energy and emits electrical energy. Some transducers are able to operate bidirectionally, i.e., to receive energy in one form and to emit energy in a second form, and also at a different time to receive energy in the second form and to emit energy in the first form. A permanent magnet loudspeaker is an example of a bidirectional electro-acoustic transducer. Often bidirectional transducers are referred to as transceivers because, at different times, they can be both transmitters of energy and receivers of energy.

Level sensing system 10 provides a nonintrusive level sensing transducer 11 in combination with associated power, signal processing and control circuitry 15 which includes a special purpose computer programmed to cause the system to provide the features, benefits and utilities reviewed above.

System 10 can include either one transceiver 11, or one such transceiver and an additional transceiver 16. FIGS. 1 and 2 show the system in its dual transceiver configuration; the present description will make clear the differences between the single and dual transceiver embodiments of the invention. Transceiver 11 preferably is mounted to an outer bottom surface of tank 12 for transmitting a characteristic signal vertically through a tank wall 17 and through liquid 13 to surface 14. The signal so transmitted is defined by a form of energy which is reflectable by liquid surface 14 back toward the transceiver as a reflection or echo signal. The presently preferred energy form used in the practice of this invention is acoustic energy, and the preferred form of transceiver is a piezoelectric transducer. Piezoelectric transducers, in general, are known in the liquid level sensing art as transceivers, i.e., signal transmitting and receiving devices.

Transducer 11 includes a housing 20, which generally is in the form of a hollow cylinder in its preferred form, and a cap 21 which preferably is rotatably sealed to a rear end 22 of the housing. A cylindrical body 23 is carried in the central bore of the housing and is movable coaxially in the housing from a position, as shown in FIG. 3, in which the body extends maximally from the housing at a front end 24 of the housing, to a retracted position at least partially inside the housing. The body is biased outwardly of the housing by a spring 25 which cooperates compressively between the inner end of cap 21 and a circumferential flange 26 around the body. The flange, in turn, abuts a shoulder 27 in the housing bore to define the maximally extended position of the body in the bore.

Body 23 preferably is defined of a non-metallic material such tetrafluoroethylene, and the cap and body can be made of a similar material or of a metal such as stainless steel, depending upon customer requirements.

The rotatable sealed connection of cap 21 to housing 20 preferably is achieved, as shown in FIG. 3, by an O-ring 28 and a snap ring 29 which cooperate in the housing bore on opposite sides of a circumferential flange 30 on the outside of the front end of the cap. An O-ring 31 provides a sliding seal between the housing and the body near the front end of the housing. A further mounting O-ring 33 is carried in the front end 24 of the housing about the perimeter of the body for engaging tank wall 17 upon mounting of the transceiver on the tank.

A wafer 34 cut from a piezoelectric crystal of suitable composition is mounted in a recess in the body closely adjacent the front end of the body. A quantity of epoxy resin 35 is bonded into the body bore across the front face of the piezo-wafer to secure the wafer in the body and to define a flat surface 36 coplanar with the front end of the body.

The exterior of the housing is threaded, as at 37, adjacent the front end of the transceiver. The exterior of the cap, rearwardly of the housing, is threaded at 38. The external threads on the housing and the cap facilitate mounting of the transducer to a tank outer surface through the agency of suitable mountings, examples of which are noted below but which can be provided in myriad forms to fill diverse different transceiver mounting needs.

A coaxial cable 40 is releasably connected to the rear end of transceiver cap 21 via a suitable connector assembly 41 which preferably has a female moiety carried by the cap and a male moiety connected to the cable. The internal wiring of the transceiver is as shown schematically in FIG. 4. Piezoelectric crystal 34 is connected across the secondary winding 43 of a transformer 44 having its primary winding 45 connected across the shielded positive and ground terminals of connector 41. The piezo-crystal and the transformer windings are all connected to ground. Transformer 44 preferably is of toroidal form having a core about 0.5 inches in diameter. The transformer is located inside the transceiver body 23 adjacent the piezo-crystal and is held there by a suitable potting material (not shown) which substantially fills the interior of the body. The piezo-crystal, the transformer and the connector elements are suitably interconnected within the transceiver.

As shown in FIG. 6, sensing system 10 includes control and operating subsystems and components (collectively denoted as 55) which drive transceiver 11 as a transmitter, which receive echo signals from the transceiver operating as a receiver, and which operate upon and process the transceiver driving and echo signals to cause the transceiver to operate in the most efficient way in a particular application, to obtain reliable and accurate data descriptive of location of liquid surface 14 in tank 12, and to achieve other objectives described below. The control and operating system includes a transmitter 47 and a receiver 48 which are connected alternately to transceiver 11 via cable 40 depending upon the state of a switching relay 49. When the transmitter 47 is connected via the relay to the transceiver, the transceiver operates in its transmit mode to emit through tank wall 17 toward liquid surface 14 an energetic acoustic signal of selected frequency within a range of frequencies used within sensing system 10. When the receiver 48 is connected via the relay to the transceiver, the transceiver operates in its receive mode to accept acoustic echo energy from the liquid surface and to generate an electrical echo signal which is sent via cable 40 to receiver 48.

The operating frequency range of transceiver 11 preferably is from about 500 kHz to about 2.0 MHz. Within this frequency range, piezo-crystal 34 appears as a capacitor to transmitter 47. To obtain efficient power application of a crystal energization signal to the crystal from transmitter 47 with relatively low power application across cable 40, the crystal is driven via transformer 44 which, with the crystal, comprises an LC circuit which resonates at about 1.0 MHz which is within the system operating frequency range. The crystal appears as about a 0.0012 microfarad capacitor; the transformer secondary has an inductance of about 21.1 microHenries. The turns ratio of the transformer preferably is 2:1. The presence of transformer 44 between crystal 34 and receiver 48 when the transceiver is in its echo-receive mode causes the electrical echo signal generated by the piezo-crystal to be stepped down within the transceiver. A step-up transformer, impedance matched to transformer 44, is provided in receiver 48 to return the received echo signal to the magnitude it has as generated by the crystal.

Piezo-crystal 3 and its supporting structure comprise a sensor in the transceiver. The sensor is intentionally defined separately from transceiver housing 20 for two reasons. First, the separation of the sensor from the housing makes possible the provision of a small and relatively lower mass sensor than if the crystal were mounted directly to the housing; the housing must be relatively large to be rugged and to be mountable conveniently in use. The lower mass sensor stops vibrating (ringing) quicker after emitting an acoustic signal, and so is ready sooner to receive an acoustic echo signal. The reduced ringing time of the sensor produces a shorter dead zone in front of the sensor where measurements cannot be made. Also, the separation of the sensor from the housing enables the sensor to be spring-loaded against a tank wall independently of the force or precise manner of mounting of the housing to the tank. This makes mounting of the housing on the tank easier and less critical.

The front surface 35 of the sensor is coated with grease-like coupling agent in use of the transceiver. The agent assures a good acoustic coupling between the sensor and the tank wall, which coupling is enhanced, thereby increasing effective emitted and echo acoustic signal strengths, when the sensor is forcibly engaged with the tank wall. It is for this reason that spring 25 is relatively stiff, and why O-rings 31 and 33 are provided to contain the agent to the front of the sensor. O-ring 31 also mechanically isolates the sensor from the housing so that stresses induced in the housing due to mounting are not also induced in the sensor where they could influence performance of the piezo-crystal. A silicone grease manufactured by General Electric Company has been found which maintains its consistency well over a temperature range of $-40°$ F. to $400°$ F.

The piezo-crystal is as large in diameter as possible consistent with low mass of the sensor. The larger the diameter, the greater the amplitude of the electrical echo signal generated by the crystal.

It is important that transceiver 11 be mounted to a tank wall to have its acoustic axis (the line along which emitted signals propagate) disposed vertically within narrow limits if accurate measurements or indications of liquid level location in the tank are to be obtained. Also, as noted, it is desirable that the front face 35 of the transceiver sensor be forcibly engaged flat against the tank surface for efficient transfer of energy between the sensor and the tank wall. These considerations present very little problem if the surface of the tank where the transceiver is to be engaged, usually at the lowest part of the tank, is flat and horizontal; transceiver mounting then can be achieved via studs engaged directly with a collar or flange into which the housing is threaded, or via a collar or flange strapped to the tank. However, if the transceiver site on the tank is not flat or horizontal, then a mounting cup 50 (see FIG. 5) can be welded into a hole in the tank wall at the site. The cup has a closed end positioned in the tank, and an open lower end. The transceiver housing is affixable in the cup via threads 37 which engage internal threads in the cup near the cup closed end. The cup is affixed in the tank wall so that it receives the transceiver along a plumb line.

The circuitry 15 of the control and operating system 55 (see FIG. 6) for transceiver 11 preferably is housed in a controller box which has a front panel 56 generally as shown in FIG. 7. In the presently preferred system according to this invention, panel 56 includes a backlit four digit LCD display 57 and switches which permit a user of system to obtain measurements of tank liquid level in units or formats of his choice. Thus, the panel mounts four switches 58-61 which preferably are of the rocker type. Switch 58 is a system power switch. Switch 59 allows a user to select between "level" and "distance" readout modes, while switch 60 affords selection between readout displays in terms of percentage or specified engineering units. Indicator lamps 62, 63-64 and 65-66 on the panel indicate the state of switches 58, 59 and 60 respectively. Switch 61, as will be described below, is labelled "Calibrate" and is relevant to calibration of the level sensing system. Other indicator lights 67 and 68 indicate whether the system is in a transmit mode at any time, and whether an "echo lost" condition might exist. A four-place BCD (binary coded decimal) switch array 69 enables span information to be entered into the system to set the distance from transducer 11 to the maximum level of liquid surface 14 in tank 12. A similar BCD switch array 70 enables a calibration distance to be entered into the system memory. A further BCD switch 71 is for entry of a damping factor by which a user can instruct the system to have a time between possible changes of the data in measurement display 57 of from one-fourth second to 128 seconds. Six two-place BCD switch sets 73-78 are also accessible on panel 56 to enable desired set points to be entered pertinent to events associated with particular user-selectable liquid levels, such as alarm or control events. Each set point switch set 73-78 has a relay associated with it; one relay can be used to control an "echo lost" alarm, if desired.

Further, while not shown in the drawings, there are additional switches within the control box, rather than on panel 56, at locations not readily accessible to the average user of the system. These switches preferably include two multi-place switches A and B in which each place has two possible positions. The settings of these further switches are read only at "power on reset". Therefore, a reset switch (not shown) must be operated while power switch 58 is ON before any changes in the positions of these switches will be recognized by the microprocessor which is part of system 55 as described below. Switch A preferably is an 8 place switch, and switch B preferably is a 4 place switch. The functions or meanings assigned to the various possible operated positions of these switches are as set forth in Tables 1, 2 and 3.

TABLE 1
SWITCH A SETTINGS

| Switch Place | Off | On |
|---|---|---|
| 1 | distance mode | volume mode |
| 2 | distance units = in. | distance units = ft. |
| 3 | volume units = cu ft. | volume units = gal. |
| 4 | diagnostics disabled | diagnostics enabled |
| 5 | normal tank < 10000 | large tank > = 10000 |
| 6 | | |
| 7 | Setpoint configuration (See Table 2) | |
| 8 | | |

TABLE 2
SETPOINT CONFIGURATION SETTINGS

| Switch A Place | | | Configuration | |
|---|---|---|---|---|
| 6 | 7 | 8 | High | Low |
| off | off | off | 8 | 0 |
| on | off | off | 7 | 1 |
| off | on | off | 6 | 2 |
| on | on | off | 5 | 3 |
| off | off | on | 4 | 4 |
| on | off | on | 3 | 5 |
| off | on | on | 2 | 6 |
| on | on | on | 1 | 7 |

TABLE 3
SWITCH B SETTINGS

| Switch Place | Off | On |
|---|---|---|
| 1 | processor blanking on | processor blanking off |
| 2 | (not used) | (not used) |
| 3 | manual calibration | auto calibration |
| 4 | window enabled | window disabled |

More specifically, place 1 of switch A determines whether the data presented in display 57 will be a description of the distance from measurement transducer 11 to liquid surface 14, or whether that data will describe the volume of liquid in tank 12 below the liquid surface. If the former, then place 2 of switch A determines whether the engineering units pertinent are inches or feet, but if the latter, then place 3 of switch A determines whether volume engineering units are cubic feet or gallons. Place 4 of switch A disables or enables an internal diagnostic function which is useful principally in check-out of the system by the manufacturer or in the event service to the system should be necessary after installation. Place 5 of switch A tells the microprocessor whether the tank volume is more or less than 10,000 of the selected volume engineering units, so that display 57 can be operated to display volume to four significant places. Places 6, 7 and 8 of switch A determine how many of the relays associated with set-point switches 73-78 are in high or low modes; places 6-8 of switch A are related to the function of switches 73-78 and determine whether it is important that the liquid level rises above or falls below the levels set by switches 73-78 by which a user of the system can define specific liquid levels as to which a high or low condition is to be recognized. There are eight setpoint conditions describable by switch A, but only six are used in the presently preferred system according to the invention. Switches 73-78 enable a user to preset into the system certain levels (described in percentages of span) at which the corresponding relay will change state, so that a desired external operation can be regulated or performed, such as a valve opened or closed or an alarm sounded.

In switch B, place 1 determines whether or not the change of mode of transceiver 11 from transmitter to receiver is delayed for a time related to the transceiver dead zone (i.e., the time for the piezo-crystal to stop ringing) after operation of the transceiver to transmit an acoustic pulse. The usual operating condition for this switch place is OFF. Place 3 of switch B normally is factory preset to inform the microprocessor whether a calibration transceiver 16 is present in the system; if such a transceiver is not present, the "AUTO-CAL" system program sub-routine is disabled. Place 4 of switch B normally is used by manufacturing personnel to check the system; when "ON", the WINDOW program subroutine is by-passed.

Span BCD switch group 69 is provided in panel 56 so that a user can dial into the system data which describes the highest liquid level which can possibly and realistically be sensed in tank 12 by measurement transducer 11. The span value is independent of the desired maximum operating liquid level in tank 12 a user may wish to establish as pertinent to actual use of system 10. Switch 59, when set to its "DISTANCE" position, causes display 57 to display liquid level as actually measured or sensed by system 10 and to ignore any setting of span switch group 69; this operation is most useful when a measured liquid level distance is being entered into the system or when the system is being operated in a calibration mode. When switch 59 is in its "LEVEL" position, the microprocessor considers the data provided by the span switch group and does not allow display 57 to show a value above a full tank as defined by the span data.

Switch 61, if "ON", causes the microprocessor to read the data entered in BCD switch group 70 only when power is first supplied to the system. If the data entered into switch group 70 is ever changed, that changed data is not recognized by the system microprocessor 84 until the power has been turned off, switch 61 turned "ON", and power switch 58 then turned "ON".

There is behind panel 56 a switch 72 (see FIG. 7) which is the same type as switch 71 in the panel; switch 72 is operable to define a calibration interval for system 10.

As will be made more clear from the following descriptions, system 10 has a basic time interval at which transducer 11 is operated to send a signal toward liquid surface 14; in the presently preferred embodiment of the invention that basic interval is ¼ second long. That is, every ¼ second, a sound pulse of selected duration (preferably 40 microseconds) is emitted by transceiver 11 irrespective of the setting of either of switches 71 or 72. Although the possible settings of these switches are described in terms of time (seconds or minutes), in reality they determine the number of sound pulses which will be emitted by transceiver 11 between the occurrence of certain recurring processes and events in the system. Those processes are confirmation or changes of the value shown at display 57, and recalibration of the system in terms of velocity of sound if the system includes a calibration transceiver 16 and the AUTO-CAL feature of the invention; the setting of the damping switching 71 regulates the former process For example, if switch 71 is set to "¼ second", that means display 57 is confirmed or changed, as appropriate, each time transceiver 11 receives a good echo of an emitted sound pulse; if that switch is set to "2 seconds", display 57 is confirmed or changed after every eight good echoes have been received and the data therein in those echoes has been averaged. Similarly, if switch 72 is set at "20 minutes", the sound velocity in the liquid of interest is recomputed by the AUTO-CAL feature after each 4800 sound pulses have been sent by transceiver 11, or once every 20 minutes.

General System Organization (FIG. 6)

Referring to FIG. 6, circuit 15 includes an AC to DC power supply 80 which provides electrical power to the analog components in the circuit, namely, transmitter 47, receiver 48, relay 49, an echo detector 81 which operates on the receiver output, and a DC to DC power supply 82 which provides an isolated operating voltage and an isolated ground to the digital components of the circuit. The principal digital components of circuit 15 preferably include a microprocessor 84, a frequency synthesizer 85, a digital interface 86 to a user's computer if desired, an analog output module 87, an analog to digital converter 88, and a relay latch controller 89. The digital components are coupled appropriately to a data bus 90; relay 49, transmitter 47, receiver 48, and echo detector 81 also are coupled to the bus for signal or data transfer as appropriate.

In FIG. 6, the microprocessor and memory functions of COS 55 are depicted as a discrete component 84 of circuit 15. In practice, however, the processing and memory functions, preferably EPROM and RAM memories, may be distributed throughout the other digitally oriented aspects of the circuit as convenient or appropriate. The EPROM memory contains the main and subsidiary programs for system 10, and the RAM contains the data entered via control panel 56, as well as other usage-specific data needed by the system to provide information of the kind and format desired by the system user. Preferably the RAM is a non-volatile memory which can be erased or overwritten when in a powered state, but which does not lose its memory content in the event of a power failure.

More specifically, power supply 80 preferably provides ±30 VDC, ±15 VDC and analog ground outputs, whereas power supply 82 preferably provides ±15 VDC and isolated ground outputs which are optically and magnetically protected. The isolated ground is used to couple circuit 15 to a user's computer, as where system 10 is part of an overall computer-monitored process control system in a food processing or pharmaceutical making facility, e.g. There preferably is a digital ground connection provided for the digital components of circuit 15; that ground is tied to analog ground at a location of the master circuit board of the circuit to avoid ground loops on the board.

Receiver 48 amplifies the echo signal generated by transceiver 11. It includes an automatic gain control (AGC) which maintains the echo signal at a constant amplitude and generates a voltage which is proportional to the signal strength. The output from the receiver is converted by echo detector 81 into a series of pulses which are supplied to bus 90. Also, analog to digital converter 88 converts the AGC voltage into digital form so that microprocessor 84 can monitor the echo signal strength to determine the optimum frequency of the acoustic signal to be emitted by transceiver 11 during regular operation of system 10.

Transmitter 47 provides the driving signal which causes transceiver 11 to generate an emitted sound pulse. The transmitter is responsive principally to frequency synthesizer 85 which preferably is a phase lock loop (PLL) oscillator whose frequency is determined by the microprocessor. The microprocessor writes the frequency information to the PLL circuit in the form of a byte of digital data, which data is converted to the proper frequency by the PLL circuit and used to control operation of the transmitter.

Relay latch controller 89 is used by the system microprocessor to regulate operation of the relays in the system, including transceiver mode selection relay 49. Analog output module 87 converts information from the microprocessor to analog form for use with external analog devices such as meters or chart recorders, for example. The analog information is made available at suitable terminals 92.

Digital interface 86 converts the digital information from the system microprocessor to a 4–20 milliamp isolated output which is made available externally, with the isolated ground from power supply 82, via a two-lead connector.

The circuit components and features described above, when operated under control of the system's principal and subsidiary programs, enable the external transceiver 11 to provide accurate and reliable information about the location of the liquid level 14 in tank 12, without prior knowledge of the material or thickness of tank wall 17 or of the velocity of sound in liquid 13. It is known that the speed of sound in liquids can vary considerably from liquid to liquid, and with temperature within a given liquid. It is not so well known that where acoustic energy is transmitted though a wall and a liquid to a liquid surface for generation of a reflection or echo which propagates from the liquid surface back through the liquid and the wall, the acoustic frequency productive of the strongest echo sensible outside the wall varies sharply with wall material, wall thickness and the liquid. Those influences are dealt with automatically in system 10 by an automatic frequency selection and monitoring feature (called "Auto-Tune") of this invention, the operations and steps of which are shown in the flow chart of FIG. 12. However, explanation of the frequency selection procedure is best based upon an understanding of other more general procedures and operations under the control of the main system program depicted in FIGS. 8A–8D; that mainline program is referred to as XLS.COS. "XLS.COS" is an abbreviation for external level sensor control and operating system.

Main Operations Sequence (FIGS. 8A–8D)

Figure 8B:
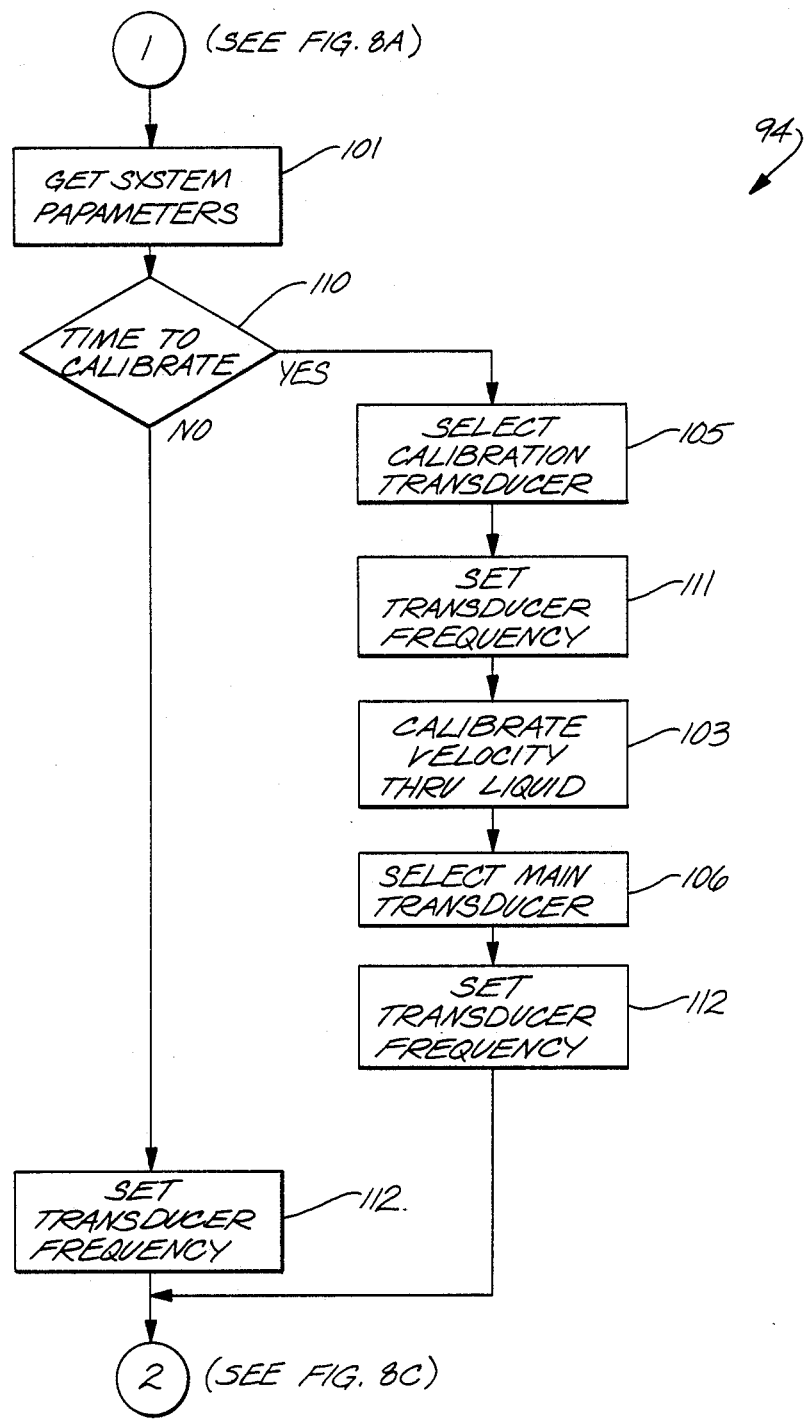
Figure 8C:
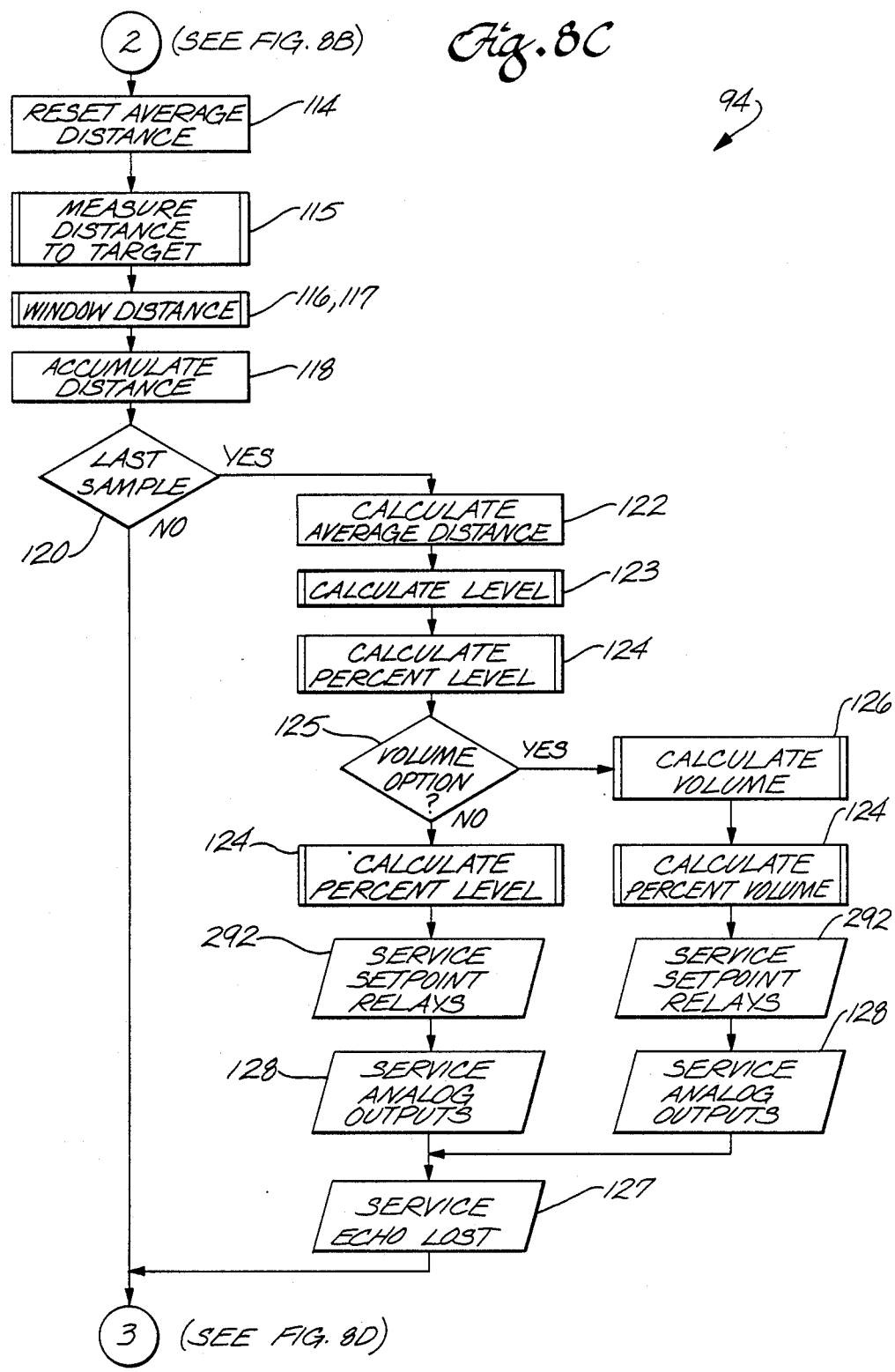
Figure 9A:
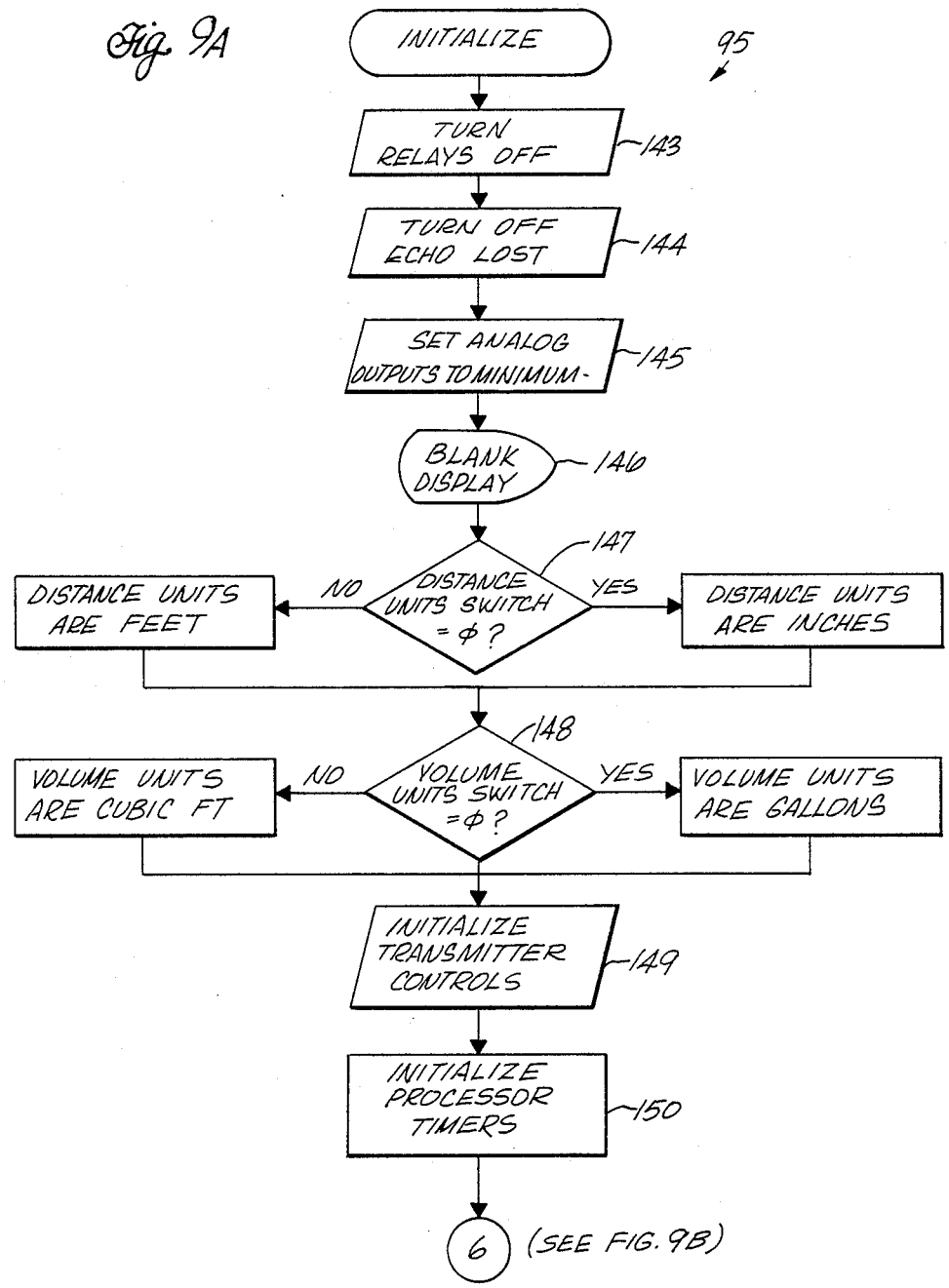
FIGS. 9A and 9B together comprise a flow chart descriptive of an INITIALIZE operations sequence performed as a subordinate aspect (subroutine) of the operative sequence depicted in FIGS. 8A through 8D.
Figure 9B:
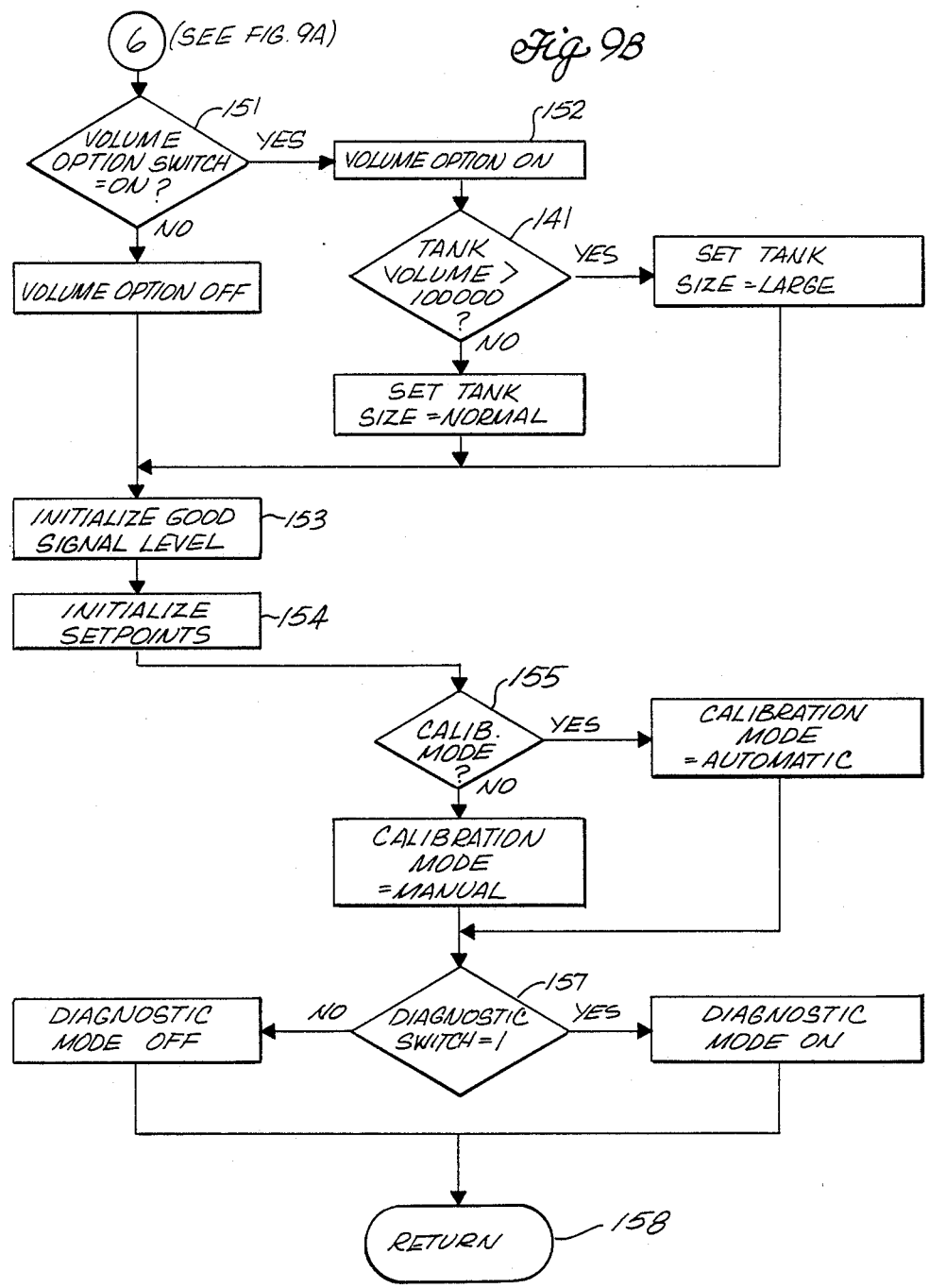

The XLS.COS program commences with an INITIALIZE operation 95 which calls up and runs a subroutine illustrated generally in FIGS. 9A and 9B; the doublebarred ends of rectangular block 95 in FIG. 8A represents a subroutine call in the mainline XLS.COS program. The details of called subroutines are set forth in others of the accompanying drawings. A simple rectangular box in the drawings (FIGS. 8–23) represents an action or operation performed by the program or subroutine of interest. A diamond box represents a decision point in the program of interest. A parallelogram box denotes an operation in the XLS.COS program, or a subroutine thereof, interfaced with hardware of the system to obtain information or to send information. The use of a "boat-shaped" box (see box 133 in FIG. 8D) represents an operation having a visible result at display panel 56. A circle in FIGS. 8–23 represents a continuation to the similarly numbered place on a related FIG. in the accompanying drawings, e.g. to continue from FIG. 8A to FIG. 8B.

The XLS.COS program continues, after completion of the INITIALIZE subroutine called at 95, with a system clock start operation 97. It will be appreciated that liquid level measurements are based fundamentally upon measurements of elapsed time between the transceiver events of (a) send an emitted signal to the liquid surface and (b) receive an echo from the liquid surface, and so a system clock is essential to operation of system 10. The XLS.COS program then decides whether the system has either automatic calibration (decision box 98) or manual calibration of the sound velocity in the liquid then present in tank 12; it will have one or the other of these calibration modes. If the invention is provided in its single transceiver 11 embodiment, it does not have automatic velocity calibration; if the invention is provided in its dual transceiver 11, 16 embodiment, it has the calibration feature. That feature, if present, is referred to herein as "Auto-Cal".

Assume system 10 is present in its single transceiver configuration, in which case operations sequence 101, 102A, 103 in FIG. 8A is relevant. In that event, the user of the system makes one physical, manual measurement of liquid level in the tank for the liquid of interest, and enters that value into the system via BCD switch array 70 on the controller box panel 56. That action (subject to switch 61 being ON when switch 59 is turned ON) places that value in the system RAM as a specific system parameter. That known distance is then used, after the best operating frequency for transceiver 11 has been determined at 102A, to measure (103) the velocity of sound in the liquid of interest by use of the elapsed time between successive emitted and echo signals sent and received by transceiver 11. That velocity figure is stored in RAM as a specific system parameter. That velocity figure is not valid for any other liquid; if the liquid is changed, then a new manual measurement of liquid depth must be made, that measured value entered via switches 70 into RAM, and a new sound velocity computed and stored as a new specific system parameter. In other words, if system 10 does not include the Auto-Cal feature, program 94 calls and runs in sequence the PARAMETERS, TUNE, and CALIBRATE subroutines shown in FIGS. 10, 12 and 11, respectively.

On the other hand, if system 10 is present in its dual transceiver configuration shown in FIGS. 1, 2 and 7, then second transceiver 16 (a calibration transceiver) is used to provide data for computation of the pertinent sound velocity after information on one system constant has been obtained and entered into RAM; see operations sequence 105, 101, 102B, 103, 106, 102A in FIG. 8A. That system constant is the physical distance from transceiver 16 to the far wall of tank 12; transceiver 16 is so mounted (see FIG. 1) to the tank that its acoustic axis is aligned with a line between opposite walls of the tank where the walls are parallel to each other and perpendicular to the line within specified limits, say about 2° or 3°. That cross-tank distance is a property of the tank and is readily obtained either by measurement of the tank or from relevant drawings describing the tank. That distance is entered as a system parameter into the RAM of system 10 via switch array 70. Thereafter, provided that the line along which second or calibration transceiver 16 looks across tank 12 is below the surface of liquid in the tank, the system is capable of automatically calibrating itself in terms of sound velocity in the liquid of interest at any time. This is done by coupling transmitter 47 and receiver 48, in sequence, to transceiver 16 via relay 49 (see operation 105 in FIG. 8A) and by operating that calibration transceiver first (102B) to determine the optimum acoustic frequency for use with the liquid of interest, and second (103) to measure the elapsed time between an emitted signal and an echo at the transceiver for acoustic energy directed across the tank in the liquid. Calculation of sound velocity is straight forward since time and distance are known. If a system according to this invention has the Auto-Cal feature, the liquid of interest can be changed and the system automatically recalibrated for that liquid; this is the case because the XLS.COS program (FIGS. 8A–8D) automatically runs the Auto-Cal subroutine on start-up as shown above, and periodically thereafter as needed (see FIG. 8B) because the XLS.COS program repeats continuously so long as power is provided to system 10.

Referring to FIGS. 8A–8D, it is thus seen that, according to the structure and definition of program 94, if system 10 has the Auto-Cal feature as determined at decision point 98, then the program follows operation sequence 105, 101, 102B, 103, 106, 102A to compute the sound velocity in the liquid of interest by use of the calibration transducer, then to select (106) the level sensing transducer, and then to establish (102A) the optimum operating frequency for the latter transceiver, which frequency may be different from the optimum frequency for the calibration transceiver. This is, program 94 runs the TUNE and CALIBRATE subroutines in connection with calibration transceiver 16, and then it runs the TUNE subroutine in connection with measurement transceiver 11. On the other hand, if the Auto-Cal feature is not present in system 10, decision point 99 leads to the initial calibration sequence 101, 102A, 103 described above. Whichever sequence of operations is initially followed, either leads to a program junction point 108 which is an entry point to a loop in program 94 (see FIGS. 8B–8D in combination) which is followed endlessly until the program is interrupted by a loss of power.

On entering the loop shown in FIGS. 8B–8D, program 94 first calls and runs the PARAMETERS subroutine 101 to confirm system parameters which now include the optimum frequency for measurement transceiver 11, as well as that for calibration transceiver 16 if present, as determined by earlier performance of operation 102 for the respective transceivers. The program then decides 110 whether it is timely to recalibrate the system as to sound velocity in the liquid of interest; that velocity could change due to a temperature change, for example. Whether decision 110 can be implemented to recalibrate the system for sound velocity is dependent upon the Auto-Cal feature being present in system 10; if it is, then implementation of the recalibration sequence 105, 111, 103, 106, 112 is dependent upon a predetermined time having elapsed since that operations sequence was last performed. That predetermined time is established via switch 72. If recalibration is both possible and timely, then calibration transducer 16 is selected (105), its operating frequency is set (111) by use of the frequency value established at operation 102B and thereafter stored in memory as a system parameter, the sound velocity is recomputed (103), the measurement transducer 11 is selected (106) and its frequency set or reset (112) by data obtained as a system parameter. Then, whether or not the recalibration has been pursued (whether or not possible or timely), the operating frequency of the measurement transducer is set or reset (112) from system parameter data.

As shown in FIG. 8C, a temporary distance buffer in memory is then reset (114) to zero and the distance to target (liquid level 14) is measured (115) by use of the distance calculation subroutine shown in FIG. 13. A "window" of distance above and below the measured liquid level is then examined (116) (see FIG. 18) and perhaps adjusted (117) in size (see FIG. 19); the subroutines pertinent to the window feature of the invention, a feature which filters spurious echoes out of the data stream to the microprocessor, is described more fully below. The distance measured by subroutine 115 is stored by operation 118 in which the distance measurement just made is added to a selected number of preceding measurements and that sum is stored in memory.

Program 94 then decides (120) whether the proper amount of time has passed since the system made the liquid level measurement last presented by the system to the outside world at display panel 57. How long is a proper amount of time is determined by the user when damping switch 71 is set to any one of ten different time intervals ranging, according to a binary-coded place valuation sequence, from 0.25 seconds to 128 seconds. As described above, "damping" has to do with how frequently the user desires the displayed liquid level measurement to be updated or altered by the system. If system 10 is being used in a context where liquid level changes can occur rapidly and are important to whether or not some related control action is to be taken, as in an automated chemical reaction, the user may wish to have new data available four times a second; if so, then each distance measurement is to be displayed, the sum stored at operation 118 is a single measurement and no more, and each measurement is a "last sample" at decision point 120. On the other hand, the change in liquid level may not be rapid, in which case a user may want updated information from the system every 128 seconds; the period of interest is the damping interval set via switch 71. At decision point 120, program 94 asks whether the damping interval has expired since display 57 was last updated; if not, the last level measurement made by the system (at its own four times per second rate of sampling the tank level) is ignored and no change is made in the state of display 57. However, if the damping interval has elapsed with the occurrence of the last measurement, then the sum stored in memory due to operation 118 is processed for display at panel 56.

Figure 15:
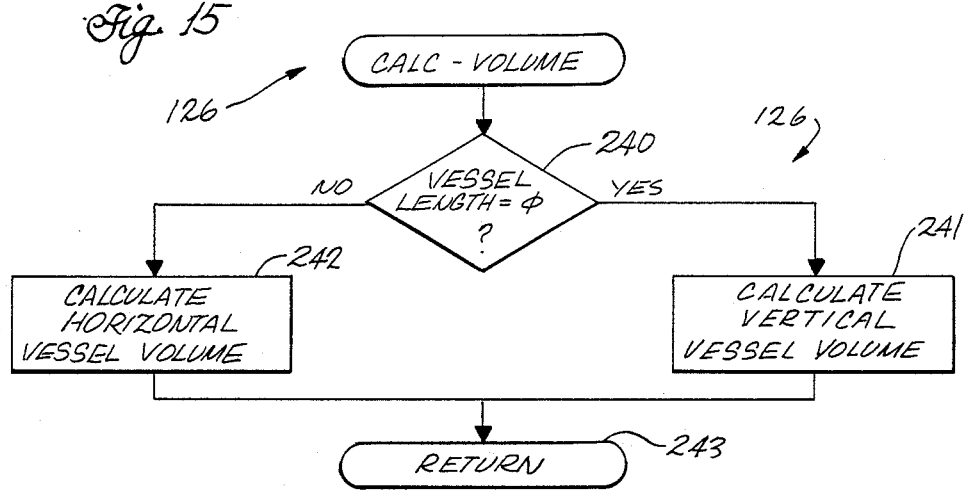
Figure 16:
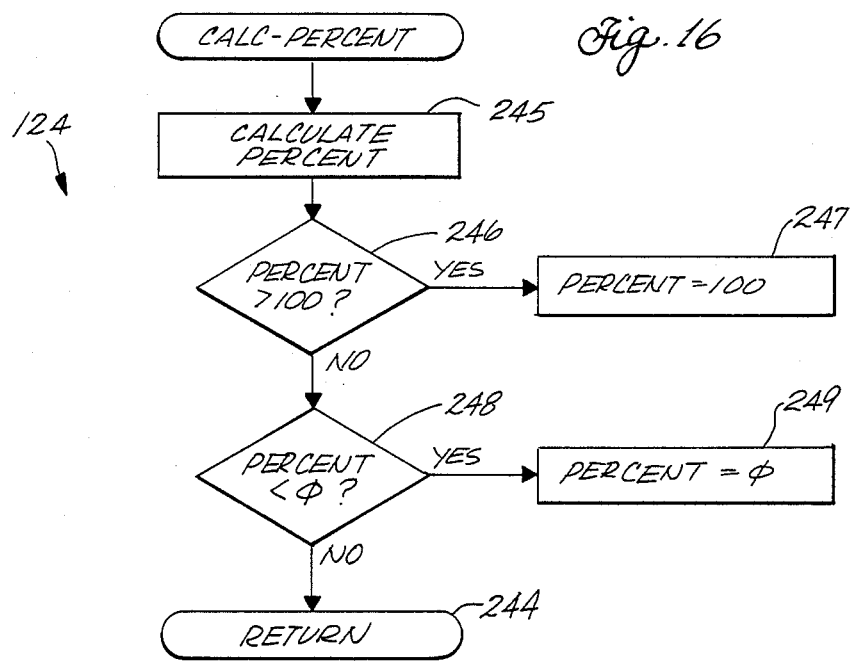

This is done by calculation (122) of the average distance to liquid level 14 from transducer 11 as determined by dividing the sum of measurements accumulated in memory by the number of measurements added to obtain that sum, by use of that average distance to calculate (123) the liquid level by the subroutine shown in FIG. 14, and by calculating the level as a percentage (124) of the relevant span criteria (see FIG. 16). The value produced by operation 122 is the value which is reset or zeroed by operation 114. The program then asks (125) whether the user wants the average measurement of liquid level position expressed as a volume, rather than as a height or distance. If not, then the calculated level percentage from operation 124 is adopted as the recalculated liquid level expression and that expression is used to operate, if needed, the relevant set point relays (292); a form of that expression is presented (128) to the relevant analog output terminals 92. If the user desires (decision point 125) the recalculated level measurement to be expressed in terms of volume, those absolute (126) (see FIG. 15) and percentage (124) computations are made by the microprocessor which contains the relevant formula for calculation of tank volume, the pertinent dimensions of the tank as system parameters, and other data enabling the level determined by operation 123 to be expressed as a volume. The volume, as so ascertained by subroutine 126, is also calculated (124) as a percentage of full span volume and the relevant data is provided to the pertinent set point relays (292) and analog output terminals (128). However, if there is not a new level measurement available from system 10 when the damping interval expires, due to transducer 11 not sensing an echo from liquid surface 14, that event means that no level recalculation is possible, and the echo lost indicator 68 may be lit, as indicated at 127 in FIG. 8C; if there was a recalculation made and the echo lost indicator had been lit, it is turned off as also indicated at 127. Twenty echoes in a row, preferably, must be lost for indicator 68 to be lit or turned ON.

The last portion of the loop of program 94 is depicted in FIG. 8D and is the portion of the loop which controls how information is displayed on the system control and display panel 56. For every measurement of liquid level distance made by system 10 according to its own four times per second operating cycle of transducer 11, which cycle is at least as often and likely much more often than a recalculation is made as determined by the system damping interval, program 94 makes a series of decisions which govern what a user sees at panel 56; that series of decisions is made in the context of either the last displayed value of calculated level in the event the answer at decision point 120 is "NO", or the newly recalculated level in the event the answer at decision point 120 is "YES". In other words, the effect of the display-oriented portion of program 94 shown in FIG. 8D is to refresh display 57 with the value previously displayed unless a new calculation of liquid level has been obtained by operation 122 pursuant to a "YES" decision at 120. The first decision 130 (see FIG. 8D) so made is whether switch 59 has been operated to select "Level" or "Distance". If the former, then the program decides (131) whether the user desires the measurement stated as an absolute or a percentage; it operates display 57 accordingly as represented at 132 and 133. However, if the user has set switch 59 to the "Distance" position, the choice subsidiary to decision 130 is whether the user has selected the volume option (134), and secondly whether switch 60 is in its "%" position (135). If neither "level" nor "volume" nor "%" have been selected, the measurement is displayed (136) as a distance; i.e., the value computed at operation 122 is displayed. If "volume" but not "%" has been selected, the measurement is displayed (138) as a volume in the units requested. If both decisions 134 and 135 are "yes", the measurement is displayed (139) as a percent of volume.

Lastly in the loop of program 94, after the display decisions have been made and the pertinent measurement has been refreshed (confirmed) or newly displayed, the program returns to junction point 108 and the sequence loop shown in FIGS. 8B–8D is repeated.

INITIALIZE Operations Sequence (FIGS. 9A and 9B)

As described above, the first operation of the XLS.COS mainline program 94 is to call and run the INITIALIZE subroutine 95 which assures that conditions are suitable for operational start-up of the system. That subroutine is represented in FIGS. 9A and 9B. That subroutine commences with turning off (143) all relays, turning off (144) the echo lost indicator 68 on panel 56, setting all analog outputs to minimum values (145), and blanking (146) display 57. The state of switch A at place 2 is reviewed (147) to determine whether distance units are to be feet or inches; see Table 1. The state of switch A at place 3 is reviewed (148) to determine whether volume units are to be cubic feet or gallons. The values pertinent to transmitter 47, notably those pertinent to frequency synthesizer 85, are set (149) to initial values, as are those (150) of all timers, delays, buffers and counters in the system. The distance/volume selector is checked for decision (151) about ON or OFF status by examination of the state of place 1 of switch A. If that place is ON to indicate selection of the volume option (152) then place 5 of switch A is examined (141) to decide whether the tank is of normal or large capacity.

Further, the INITIALIZE subroutine 95 then establishes (153) the initial conditions under which the Auto-Tune process 102 (see FIG. 12) will operate. Relevant set points are checked and turned off (154); see Table 2 regarding places 6, 7 and 8 of switch A. Then a decision about the calibration mode of the system is made (155) by examination of place 3 of switch B (see table 3 above). Place 4 of switch A is examined to decide (157) whether any diagnostic features of the system are to be activated. The INITIALIZE subroutine then ends with a return 158 to main XLS.COS program 94.

Figure 10:
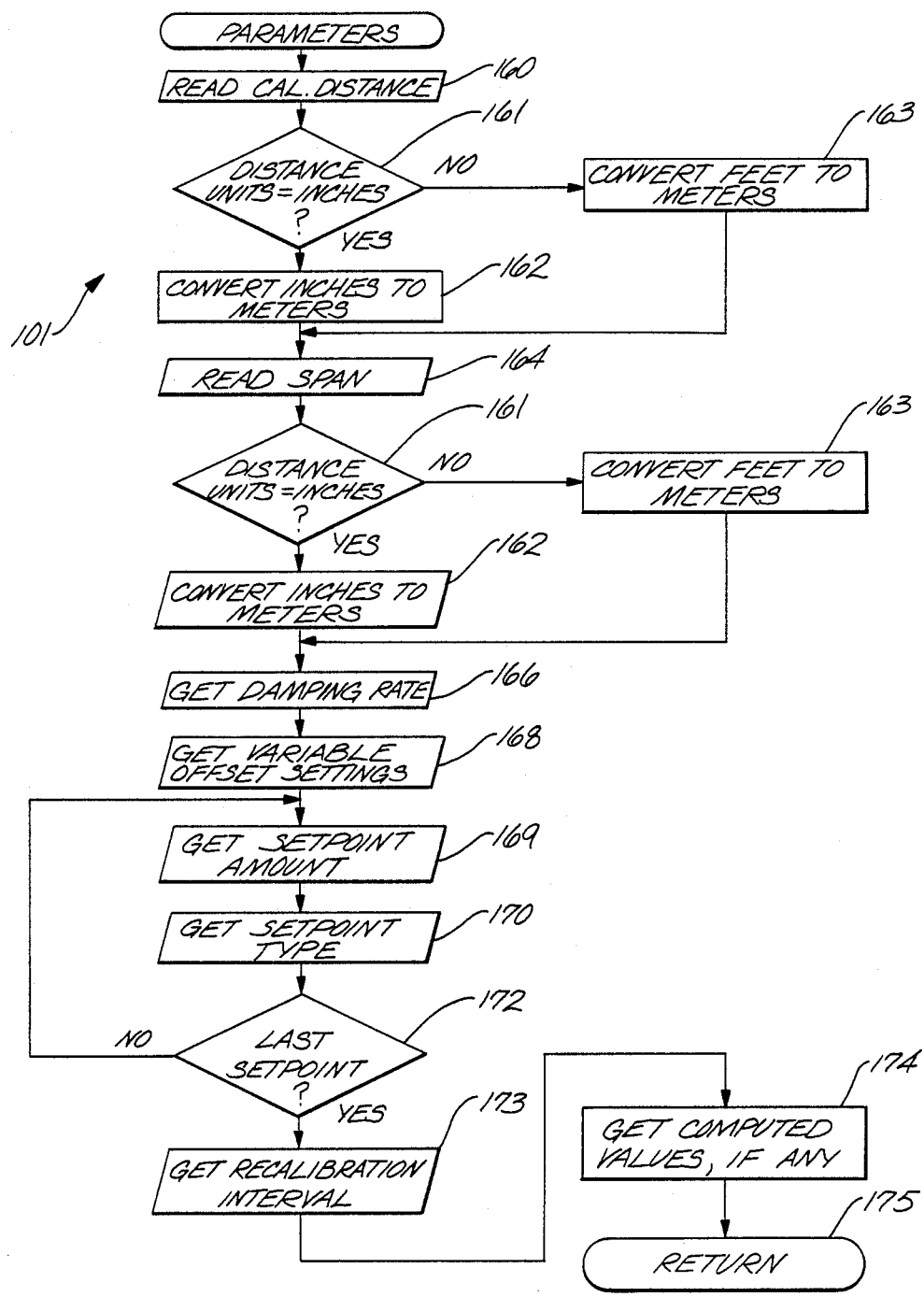
FIG. 10 is a flow chart descriptive of a PARAMETERS operations sequence which is another subroutine of the system shown in FIGS. 8A through 8D.

PARAMETERS Operations Sequence (FIG. 10)

The PARAMETERS subroutine 101 (see FIG. 10) is called several times during the course of running the XLS.COS program; this is shown in FIG. 8 by use of the "Get System Parameters" call event. This subroutine commences with the reading (160) of the calibration distance. If the parameters subroutine is being run in response to a first call of XLS.COS program 94 upon initial start up of system 10, in which power switch 58 has been turned ON at a time when calibrate switch 61 is also ON, then operation 160 of the PARAMETERS subroutine is performed by reading the information contained in BCD switch group 70. On the other hand, if the PARAMETERS subroutine is being run pursuant to a subsequent call of the XLS.COS program or some other subroutine, operation 160 is performed by reading the calibration distance from the appropriate place in memory where it has been stored as a result of the initial reading of switch array 70 by the PARAMETERS subroutine. In other words, whenever PARAMETERS subroutine 101 is run, it looks to the memory portions of circuit 15 for the relevant data stored in memory at that time. The subroutine then decides (161) whether the distance units have been selected as inches; if not, the distance units are feet. Inches are converted to meters by operation 162 and feet are converted to meters at operation 163. The subroutine then reads (164) the span information provided by BCD switch group 69. Again, the PARAMETERS subroutine decides whether the distance units are in inches or feet and converts the span dimension, whether in inches (162) or feet (163), to meters. (The conversion of calibration distance and span units to meters is made because all computations in system 10 preferably are performed using metric units. Reconversions from metric units to applicable English units are made for purposes of making necessary displays.) Thereafter, subroutine 101 reads (166) BCD switch 71 to obtain the damping rate desired by the user. Thereafter, the subroutine reads (168) additional switches, not shown, which contain variable offset data established by the manufacturer to adjust for peculiarities in performance of transceiver 11 and of transceiver 16, if present, to the extent that the performance characteristics of those transceivers differ from a standard performance characteristic. These manufacturer-established switch settings adjust for the effects of manufacturing tolerances, piezo crystal peculiarities and other similar factors. Next, the PARAMETERS subroutine examines set point switch sets 73 through 78 in sequence to obtain (169) the value established by each set point switch set and to ascertain (170) whether that set point is a high or low set point. In other words, in operation 170 the PARAMETERS subroutine acquires information which determines whether a given set point becomes significant when the measured liquid level either rises above or falls below the related defined liquid level. The PARAMETERS subroutine then decides (172) whether all set point data have been acquired and, if so, then acquires (173) the information pertinent to the recalibration interval as established by switch 72 behind panel 56 in the system control box. Thereafter, subroutine 101 examines (174) appropriate memory locations to acquire any computed system parameter values such as the optimum operating frequency of transceiver 11 operating as a transmitter, and similarly as to transceiver 16, if present. The subroutine then returns 175 to the program from which the call to the PARAMETERS subroutine was made.

Figure 17B:
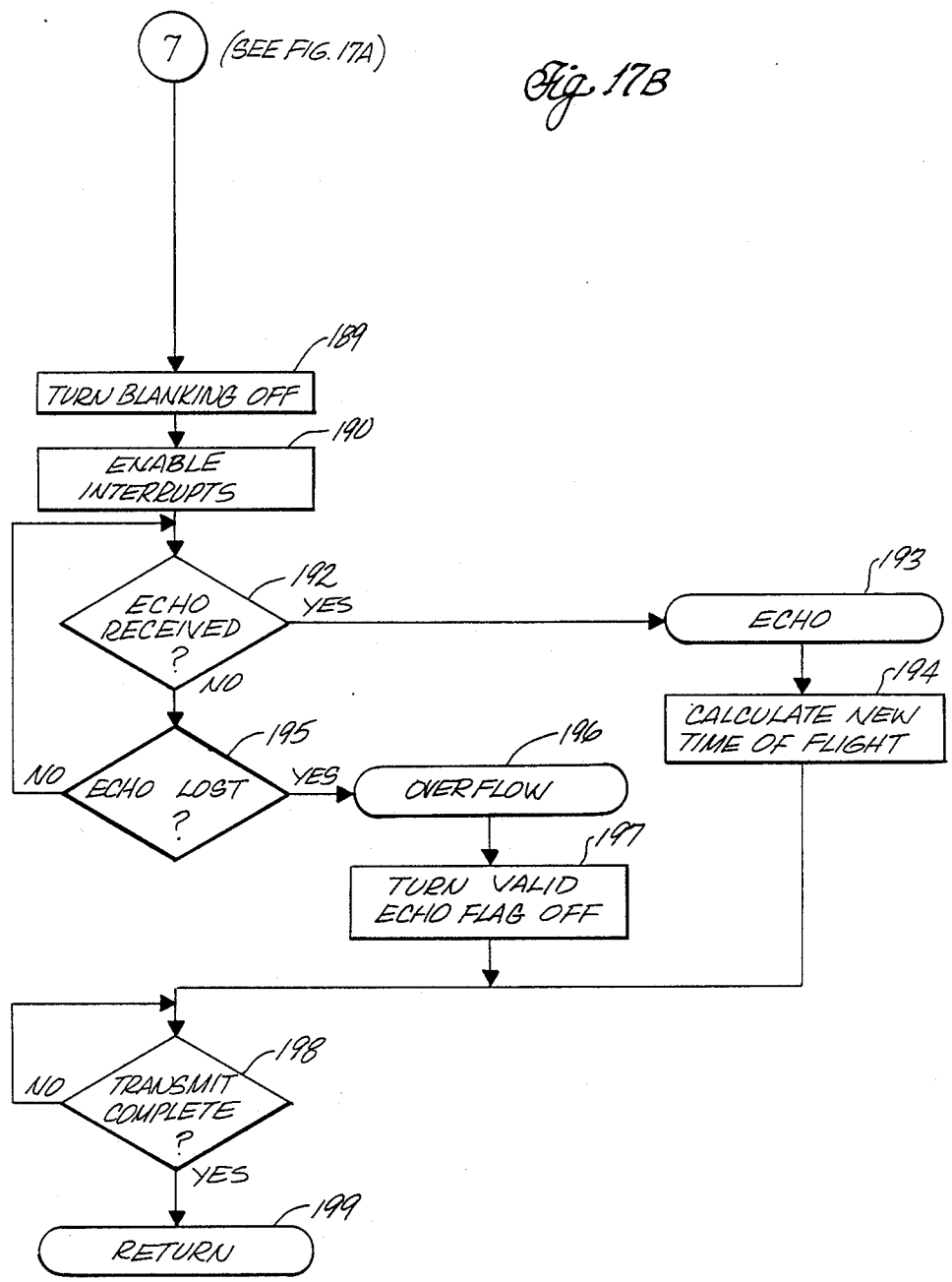

TRANSMIT Operations Sequence (FIGS. 17A and 17B)

FIGS. 17A and 17B comprise a flow chart of a TRANSMIT subroutine 180 which is not called directly by mainline program XLS.COS 94 but which is called, for example, by the TUNE subroutines 102A and 102B pertinent to transceivers 11 and 16, respectively. The TRANSMIT subroutine is dependent upon the INITIALIZE subroutine having previously been run, i.e., it is dependent upon all system hardware having previously been initialized. The TRANSMIT subroutine begins with initialization (181) of all relevant variables and flags; a flag is simply a signal or device which indicates the existence or non-existence of a condition. A transmitter interrupt is disabled (182) so that transmitter 47 is enabled, i.e., is made ready for operation to command the relevant transceiver to operate to emit a sound pulse. Next, three events occur essentially simultaneously; they are turning ON (183) a blanking timer, turning ON (184) a time of flight measurement timer, and turning ON (185) transmitter 47. The TRANSMIT routine then promptly decides (186) whether the transmitter has been ON for the desired period, preferably about 40 microseconds, to cause the sound pulse of desired duration to be sent. As soon as the sound pulse interval timer has timed out as determined at 186, transmitter 47 is turned OFF at operation 187. The subroutine then decides (188) whether the blanking timer turned at operation 183 has timed out. The timing period pertinent to the blanking timer is about 250 microseconds. The blanking interval corresponds to a distance descriptive of the dead zone of the transceiver. When the blanking timer has timed out after about 250 microseconds from being turned ON at operation 183, it is turned OFF at operation 189. Thereafter, the transmitter interrupt is enabled (190); this involves operation of relay 49 to couple receiver 48 to the pertinent transceiver, thereby to enable the transceiver to function effectively as a receiver rather than a transmitter of acoustic energy. The transceiver and receiver 48 then listen for an echo of the transmitted sound pulse to be returned to the transceiver from liquid surface 14. Accordingly, TRANSMIT subroutine 180 decides (192) whether an echo has been received within a specified, rather long period following the transmission of the sound pulse from the transceiver toward the liquid surface. If an echo is received within this period, as soon as it received a timer (turned ON upon transmission of the sound pulse by the receiver) is turned OFF. Receipt of an echo is noted at 193 and the count of the timer turned OFF upon receipt of the echo is noted and stored by operation 194. On the other hand, if decision point 192 ascertains that an echo has not yet been received within the specified period, and a related decision point 195 determines that an echo has not yet been lost by reason of the echo timer not fully timing out, then decision operations 192 and 195 are repeated in sequence until such time as an echo is either received or the echo timer fully times out. The former indicates the receipt of an echo, whereas the later indicates the loss of an echo. Loss of an echo is noted and stored at 196. The event of an echo having been lost is further noted by turning OFF (197) a flag indicating a receipt of valid echo. Upon either loss of an echo or receipt of a valid echo, the TRANSMIT subroutine then decides (198) whether the transmit cycle has been completed, i.e., whether the basic repetition rate timer for the system (preferably measuring in intervals of ¼ second) has timed out. If so, the TRANSMIT subroutine returns 199 to the other subroutine from which it was called, such as the TUNE subroutine 200, a flow chart for which is presented in FIG. 12.

Figure 12:
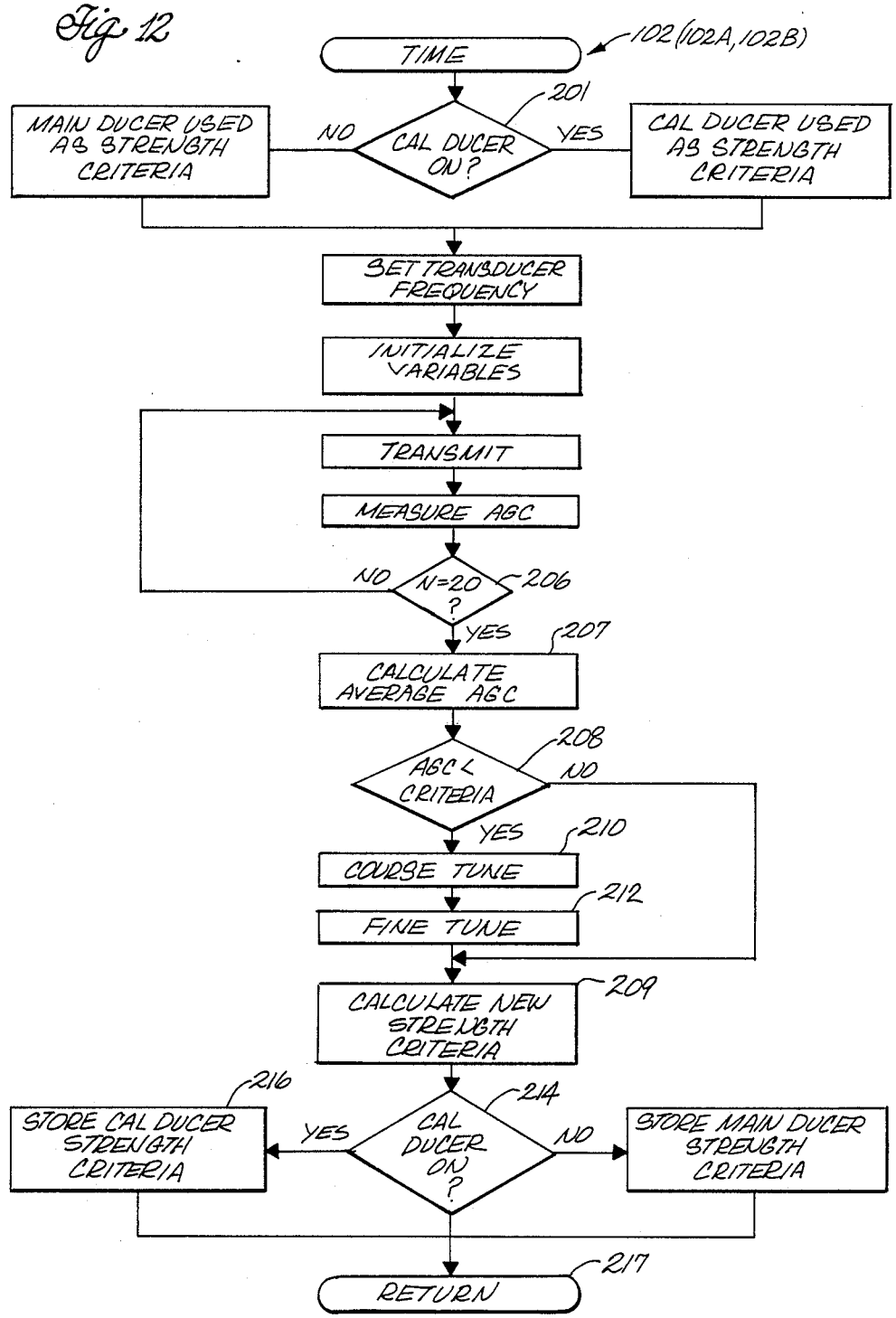
FIG. 12 is a flow chart descriptive of a TUNE operations sequence which is yet another aspect of the system subordinate to the operations sequence shown in FIGS. 8A through 8D.

TUNE Operations Sequence (FIG. 12)

The TUNE subroutine 102 used in each of operations 102A and 102B of mainline program XLS.COS provides the AUTO-TUNE feature of this invention by which system 10 automatically ascertains and establishes the optimum frequencies at which transceiver 11 and transceiver 16, if provided, operate when functioning in their transmit modes to emit a sound pulse. In other words, the TUNE subroutine shown by the flow chart of FIG. 12 determines the best frequency for crystal 34 to vibrate at in generating a sound pulse, and this is done without need for information about the material of the tank Wall to which the transceiver is attached, about the thickness of that tank wall, or about the nature of the liquid in the tank itself. An initial portion of TUNE subroutine 102 adjusts the automatic gain control circuitry of receiver 48 to enable the microprocessor thereafter to distinguish between a good or a bad echo in terms of signal strength. Thereafter, transmitter 47 is operated at a number of different frequencies as determined by frequency synthesizer 85 to find that particular transmitter operating frequency which is productive of the strongest echo. That strongest echo frequency is then established as the operating frequency for the pertinent transceiver when functioning as a transmitter for that particular liquid under the conditions which then prevail.

The TUNE subroutine commences with a decision (201) about whether measurement transducer 11 or calibration transducer 16 is the transducer which is being tuned at that time, i.e., which of these two transducers is having its fundamental operating frequency established for the tank-liquid configuration of interest. Depending upon the result of decision 201, previously established echo strength criteria, if available, are called up from memory for use during the subroutine. Thereafter, the initial operating frequency of the pertinent transceiver is established (202) by use of data taken from the master program of the system resident in the EPROM memory. Pertinent variables of the automatic gain control circuit are initialized 203, i.e., set to zero.

The transceiver tuning subroutine 102 then continues with a call to the TRANSMIT subroutine 180, the specifics of which have been described above. For each received echo, the strength of the echo is measured as indicated in FIG. 12 at operation 205 which is labeled "Measure AGC"; a signal in the automatic gain control circuit has a value which is proportional to the strength of the echo signal received by the pertinent transceiver as amplified by receiver 48. A number descriptive of the echo signal received as a result of each individual call to TRANSMIT subroutine 180 is stored in a memory. After each operation 205, the tune subroutine decides (206) whether the TRANSMIT subroutine has been run twenty times, with the echo signal strength value determined and stored in each instance. The TRANSMIT subroutine is run twenty times (5 seconds) to enable the AGC circuitry to stabilize and also to enable the calculation (207) of an average echo signal strength value based upon twenty echoes. That average echo strength value is then compared (208) against echo strength criteria taken from memory to decide whether the average echo value calculated at 207 is a good or a bad echo in terms of signal strength. Upon initial startup of system 10, the EPROM memory of the microprocessor may contain an arbitrary, rather low criterion of good echo signal level. However, after mainline XLS.COS program has been run at least once, the echo strength criteria used in making decision 208 will be obtained from some other location in the microprocessor memory as a value determined by calculation 209 as performed in a prior running of the TUNE subroutine and by storage in memory of that calculated criterion.

Assume that TUNE subroutine 102 is being run for the first time upon powering of circuit 15 in connection with startup of system 10. At that point, the average echo signal value calculated at 207 will be less than the available echo strength criteria, and so the result of decision 208 will be "yes." In that event, TUNE subroutine 102 initiates a course tune sequence 210 pursuant to which frequency synthesizer 85 controls the operation of transmitter 47 so that the pertinent transceiver operates to generate a series of sound pulses, each pulse having a sound frequency determined by the frequency synthesizer. Successive pulses (or successive sets of pulses) differ in frequency from each other by a selected amount which in the preferred embodiment of this invention is 80 kilohertz. Obviously, course tune sequence 210 involves the calling of TRANSMIT subroutine 180 each time the pertinent transceiver is required to transmit a sound pulse. A measurement of the strength of each echo signal received is stored in memory. Sufficient sound pulses are emitted and echo signals are received during the performance of course tune sequence 210 to cause the frequency synthesizer to step in the desired increments (preferably 80 Khz) through the entire operational frequency range of the relevant transducer. As noted above, it is preferred that such frequency range extends from 0.5 to 2.0 megahertz. Thus, in performing the coursed tune sequence each transducer is operated at about 20 different frequencies. When that has occurred, the stored measurements of echo signal strength obtained during performance of sequence 210 are analyzed by the microprocessor. Peak echo strength is identified at or between two of the frequencies at which the pertinent transducer was operated during performance of sequence 210.

Thereupon, TUNE subroutine 102 advances to a fine tune sequence 212 which is similar to course tune sequence 210 except that the frequency difference between successive sound pulses (or sets of sound pulses) emitted by the pertinent transducer is substantially smaller in sequence 212 than in sequence 210; in the presently preferred embodiment of this invention, the frequency difference between successive sound pulses occurring in performing of sequence 212 is 10 Khz. Another way in which fine tune sequence 212 differs from course tune sequence 210 is that the transducer frequency spectrum pertinent to sequence 212 is that which rather narrowly covers the signal strength peak value roughly identified by the analysis of the echo signal obtained in performance of sequence 210. In other words, fine tune sequence 212 is relevant only to that portion of the overall acoustic spectrum which was identified by course tune sequence 210 as containing that transducer emission frequency productive of the highest strength echo. Fine tune sequence 212 steps the transducer through this preliminarily identified, narrow width acoustic band to either confirm that the frequency used in sequence 210 to obtain the echo of highest signal strength is in fact the best frequency to use, or to identify some other optimum frequency between those used in performance of sequence 210 at which the strength of the echo received by the relevant transducer from liquid surface 14 is in fact the highest. That new signal strength value is then calculated (209) in appropriate terms. The TUNE subroutine then decides (214) which transducer, as between transceivers 11 and 16, was the transducer productive of the echo strength criteria calculated at 209 and causes that calculated value to be stored in memory either for measurement transducer 11 (as indicated at 215 in FIG. 12) or in respect to calibration transducer 16 (as indicated at 216 in FIG. 12). The TUNE subroutine then ends with a return 217 to the program from which the call to the TUNE subroutine was made.

From the foregoing descriptions of TUNE subroutine 102 as illustrated by the flow chart of FIG. 12, it is seen that this invention provides a nonintrusive sensor (preferably one using acoustic energy) for liquid level measurements in which the overall sensor system itself establishes the optimum signal transmission characteristic for the tank and liquid combination of interest in the context of the particular application or mounting of the sensor to the tank. It is not necessary to efficient operation of the measurement system either that the dimensions of the adjacent tank wall be known, or that the material of the tank wall be known, or that the identity or characteristics of the liquid in the tank be known. The control circuitry for the measurement system itself determines on a case by case basis what the optimum signal transmission characteristic of the transmitter should be. Neither the manufacturer nor any marketer of the measurement system need be concerned about these aspects of the ultimate application of the measurement system. This means that the measurement system can be manufactured in one or a few standard models and provided to representatives or distributors who can stock measurement systems for immediate delivery to users who can readily install the systems and quickly place them into effective operation.

Figure 11:
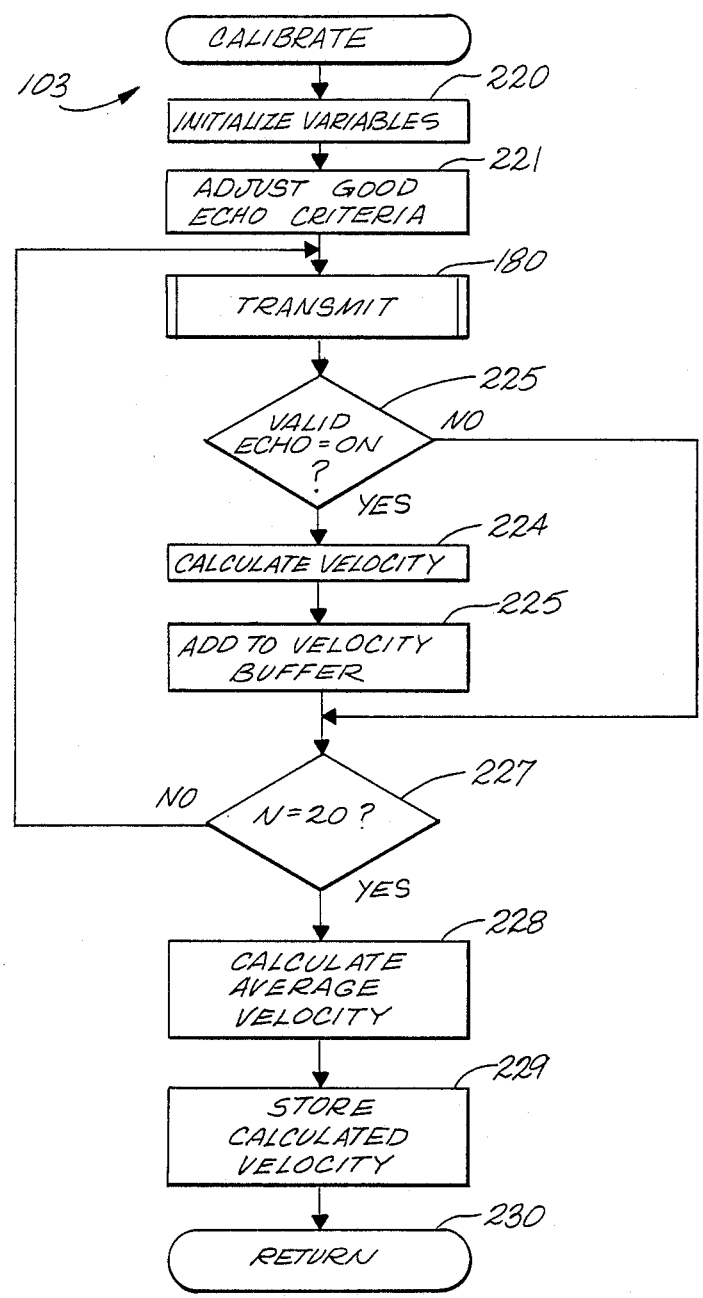
FIG. 11 is a flow chart descriptive of a CALIBRATE operations sequence which is still another aspect of the system subordinate to the operations sequence shown in FIGS. 8A through 8D.

CALIBRATE Operations Sequence (FIG. 11)

The manner in which level sensor system 10 operates to determine the velocity of sound in the liquid of the interest in tank 12 is shown in FIG. 11 which is a flow chart of the CALIBRATE subroutine 103. Calibrate is the shorthand notation for "measure sound velocity." CALIBRATE subroutine 103 is always run with respect to a known distance. As previously described, that known distance can be either a manually measured distance between liquid surface 14 and tank bottom 17 in the case where the measurement system according to this invention includes only a measurement transducer 11, or it can be the distance across tank 14 from one side wall to the other along the acoustic axis of a calibration transducer 16 in that instance where the measurement system according to this invention includes both a measurement transducer and a calibration transducer. Whichever such distance is known, that distance is entered into the computer memory via BCD switch array 70 and by placing that information into the microprocessor memory in the manner described above.

CALIBRATE subroutine 103 can be called into operation by mainline program XLS.COS whether or not the level measurement system has the AUTO-CAL feature afforded by the combination of calibration transducer 16 with measurement transducer 11. This is shown in FIG. 8A in which CALIBRATE subroutine 103 is called in each of separate operations sequences 101, 102A and 103 and 105, 101, 102B, 103, 106 and 102A. If the circumstances of use of the present level measurement system are in conjunction with a liquid in which the velocity of sound through the liquid changes with temperature and the temperature of the liquid in tank 12 can change significantly, the presence of the AUTO-CAL feature in system ten enables the data on velocity of sound through the liquid of interest to be updated and changed as appropriate, thereby assuring an accurate measurement of liquid level in the tank despite changes in liquid temperature.

CALIBRATE subroutine 103 commences with initialization (220) of pertinent variables such as timer and counter readings. The automatic gain control portion of receiver 48 is checked and adjusted as necessary to establish appropriate good echo criteria as indicated at 221. This is accomplished by analyzing the echo signal associated with ten consecutive sound pulses emitted from the relevant transceiver and by adjusting the automatic gain control circuit as necessary. The TRANSMIT subroutine 180 is then run a desired number of times which in the presently preferred embodiment of the invention is twenty times. As will be appreciated from the preceding description of TRANSMIT subroutine 180, the principal events of that subroutine which are of interest in the CALIBRATE subroutine are the confirmation of receipt of a valid echo which, if occurring, is followed by the calculation of the velocity of sound through the liquid then present in the tank. It will be recalled that performance of the TRANSMIT subroutine includes calculation (194) of the time of flight of the sound pulse into the tank to the liquid surface and back to the pertinent transceiver. Calculation (224) in CALIBRATE subroutine 103 of the velocity of sound involves use of such relevant time of flight figure with twice the distance described by the setting of switch array 70. The doubled distance figure divided by the relevant time of flight figure is the velocity of sound through the liquid of interest in a tank 12. The velocity figure so calculated by operation 224 is added (225) to any other velocity figures previously cumulated in a buffer. CALIBRATE subroutine 103 then decides (227) whether twenty valid echoes have been received and velocity calculations made. If not, the TRANSMIT routine is repeated until twenty such echoes and have been received and calculations made and stored in the buffer. Thereafter, the average velocity of sound in the liquid in the tank is calculated (228) by dividing the number in the velocity buffer by the number of measurements, say 20, made to provide that buffer total, and that average velocity value is then stored (229) for further use in operation of system 10 as appropriate. The CALIBRATE subroutine then ends with a return 230 to the XLS.COS program 94 from which the call to the CALIBRATE program was made.

Calculations Operations Sequences (FIGS. 13–16)

As shown in FIG. 8C, the recurring loop portion of mainline program XLS.COS includes call event 115 which is there labeled "measure distance to target". This is a call to program subroutine 115 which shown in greater detail in FIG. 13, the subroutine being the CALC-DISTANCE (calculate distance) subroutine, an initial step of which is measurement 231 of the time of flight of a sound pulse from measurement transducer 11 to liquid surface 14. This necessarily involves a call to TRANSMIT subroutine 180. If a valid echo has been received as ascertained (192) by the TRANSMIT subroutine, then the distance from the measurement transducer to liquid surface 14 is calculated (232) by multiplying together the measured (231) time of flight of the sound pulse and the velocity of sound in the liquid as known to the microprocessor at that time by reason of the prior performance of CALIBRATE subroutine 220. The CALC-DISTANCE subroutine then returns 233 to the program sequence from which it was called.

FIG. 8C also shows that performance of the mainline XLS.COS program involves a call to subroutine 123, see FIG. 14, which is the CALC-LEVEL (calculate level) subroutine. CALC-LEVEL subroutine 123 commences with a decision (235) about whether the measured distance is greater than the span value entered into the microprocessor via BCD switch set 69. If the measured distance is greater than span, then the level determined is equal to the span setting, as shown at 236. On the other hand, if the distance is not greater than the span value, then the level is the distance measured by performance of CALC-DISTANCE subroutine 115 as indicated at 237. The CALC-LEVEL program then returns 238 to the program sequence from which it was called.

A calculate volume call is also a part of that portion of main program 94 which is illustrated in FIG. 8C. A CALC-VOLUME (calculate volume) program subroutine 126 is shown in FIG. 15. Subroutine 126 is the only customized aspect of the system 10, if it is in fact provided. If provided, it preferably is provided on a separate specially programmed EPROM chip which can be plugged into a suitable socket on the main circuit board of circuit 15. That plug-in EPROM chip contains data specific to the tank of interest to a particular user so that, if desired, he can obtain measurements made by system 10 in terms descriptive of volume of liquid in the tank rather than in linear-measure distance or level terms. The chip includes the formulas and constants for calculating the volume of liquid at a given depth in a tank of known geometry as specified by the user of the measurement system. Accordingly, the hardware of the system provides the requisite data. An initial step of CALC-VOLUME subroutine 126 is to decide (240) whether the tank axis is vertical or horizontal. If the tank axis is vertical, then a calculation (241) of the volume of liquid in the tank is made for a liquid surface at the measured distance from the tank bottom. On the other hand, if the tank axis is horizontal, then a different calculation (242) is made of the volume of liquid in the tank using the measured distance of the liquid surface above the measurement transducer. The CALC-VOLUME subroutine then returns 243 to the XLS.COS mainline program.

The XLS.COS program also includes, at various locations, calls to a subroutine for presentation of a measured or calculated value in terms of percent. FIG. 16 is a flow chart of the CALC-PERCENT subroutine 124 which is a simple percentage computation or conversion which is applied to the measured distance as expressed either directly or as a level or a volume; see display operations 133, 137 and 139 shown in FIG. 8D. Accordingly, the CALC-PERCENT subroutine 124 commences with a straightforward calculation (245) in which the measured distance, or its equivalent level or volume, is divided by a maximum possible distance, level or volume, and that result is multiplied by one hundred. It is then decided (246) whether the result of calculation is greater than 100, in which event 100 is the displayed percent as indicated at 247. It is also decided (248) whether the calculated percent is less than zero percent; if so, then "zero" is the displayed percentage, as indicated at 249. The CALC-PERCENT program subroutine then returns 244 to the XLS.COS program.

Figure 18:
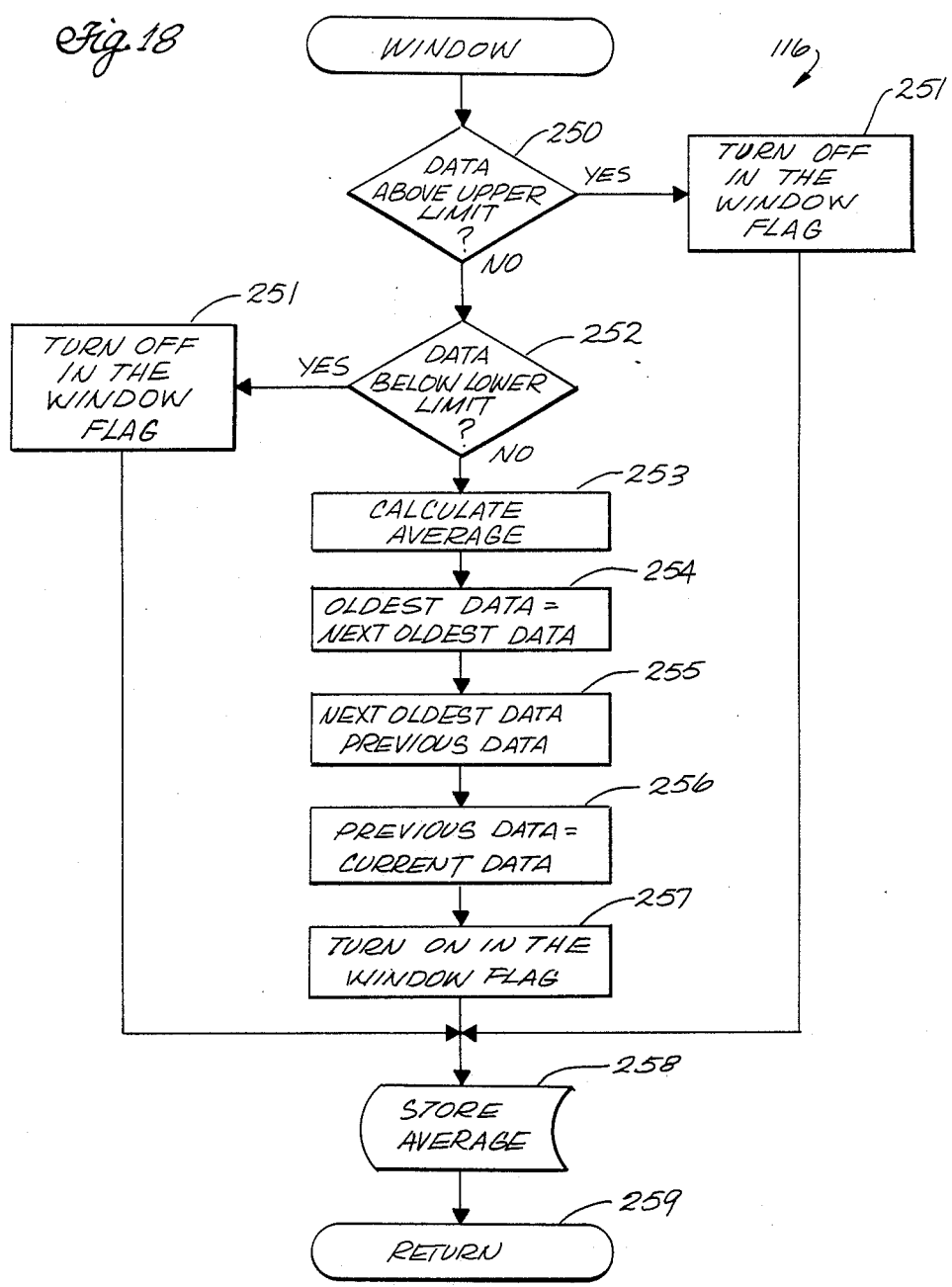
FIGS. 18 and 19 are flow charts descriptive of WINDOW and WINDOW SIZE operations sequences which are related to other aspects of the system subordinate to the operations sequence shown in FIGS. 8A through 8D.
Figure 19:
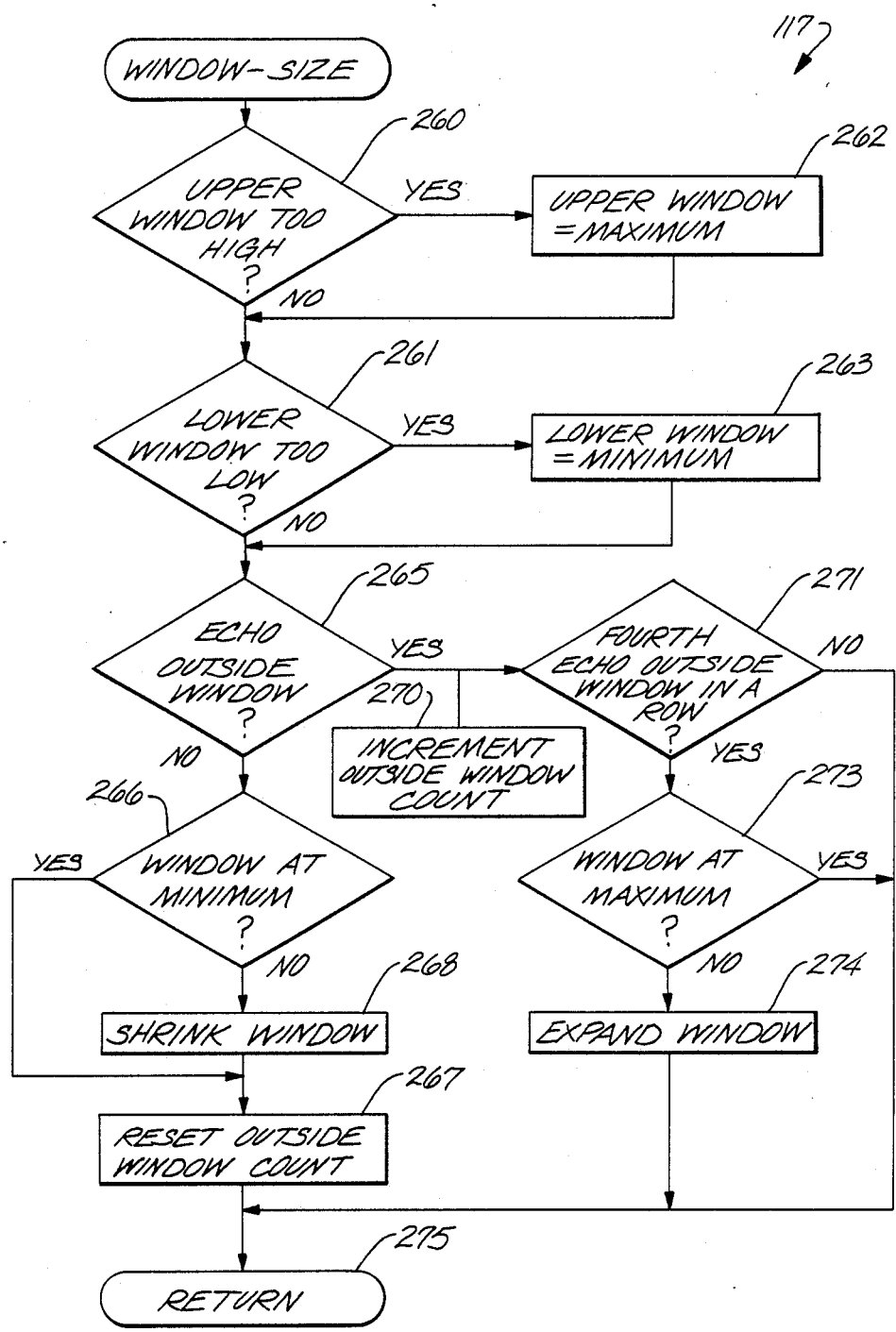

WINDOW Operations Sequences (FIGS. 18 and 19)

As mentioned briefly above, a feature of a measurement system according to this invention is a dynamic window feature which limits consideration by the circuitry of the system of spurious echoes caused by noise and secondary return of emitted sound pulses within tank 12. The "window" is analogous to an opening which extends a certain distance above and a certain distance below the actual liquid surface as last detected or measured by system 10. The window begins in its full open position with its lower limit at the bottom of the tank and with its upper limit at the top of the tank. As each one or a series of valid echoes is received, the window shrinks by two sigma; sigma is a deviation factor which can be varied in the software depending upon the criticality of the application of the system at any given time. If system 10 detects that at least four successive echoes are outside the window, the window starts expanding by sigma times the number of consecutive echoes in excess of four which are outside the window. The window expands until an echo is detected inside the expanded window. If thereafter a series of consecutive good echoes are detected within the window, then the window again begins to contract, perhaps to the minimum width of the window above and below the detected liquid surface. In the presently preferred embodiment of this invention, the upper limit of the closed window is set at about ½ inch above the detected liquid surface and the lower limit of the window is set at about ½ inch below the detected liquid surface.

If an echo corresponding to a location between the upper and lower limits of the window is detected and the echo has the appropriate signal strength commensurate with a good echo as established by the AGC criteria in effect at that time, that echo is regarded as an echo indicative of the location of the liquid surface; all other echoes which might otherwise meet the good echo criteria and which may be detected by the transceiver within the appropriate period following emission of the last sound pulse by the transceiver, are ignored. The window feature of this invention is provided by two separate but related subroutines, namely, the WINDOW subroutine 116 described by the flow chart of FIG. 18 and the WINDOW SIZE subroutine 117 described by the flow chart of FIG. 19. WINDOW subroutine 116 is the dynamic windowing routine of the XLS.COS program. It requires previous calls to INITIALIZE, TUNE, CALIBRATE and CALC-DISTANCE in order to operate properly. It also requires the address of data to be windowed. Subroutine 116 processes the data input to it and decides on its validity based upon the data's variation from a norm. The variation criteria are adjusted dynamically based upon the number of valid echoes received. WINDOW SIZE subroutine 117 opens or closes the window depending upon the data provided by the WINDOW subroutine. Subroutine 117 requires previous calls by the XLS.COS program to the INITIALIZE, TUNE, CALIBRATE and CALC-DISTANCE subroutines in order to properly size the window for the next echo. If a newly received echo is within the current window, the window will shrink by plus and minus sigma unless the window is then at its minimum position above or below the liquid surface. If the received echo is outside the current window, the window will expand by sigma times the number consecutive echoes detected outside the window.

Referring to FIG. 18 WINDOW subroutine 116 begins with a decision (250) about whether a currently received echo is above an upper limit of the window. Recall that when XLS.COS program 94 is first run, the upper limit of the window is at the upper end of tank 12. If decision 250 is that the echo of interest is associated with a location above the window upper limit, then that circumstance is noted (251) by turning off (removing) a flag indicating that the echo comes from a location within the upper and lower limits of the window. If the last received echo is from a location not above the upper limit of the window as the window then exists, it is then decided (252) whether the echo is associated with a location in the tank below the then existing lower limit of the window. If the answer to this determination is "yes," then the in-window flag is turned off (removed) as indicated at 251. Otherwise a calculation (253) of average liquid level distance from tank bottom 17 is made. Calculation 253 is a moving average calculation which includes the use of the distance value pertinent to the last received echo, together with the distance values pertinent to the last three echoes previously received as obtained from pertinent places 254, 255, and 256 of a three place buffer in the microprocessor. After the new average distance figure has been calculated, the distance value for the pertinent echo is inserted into the buffer, and the other information in the buffer places is shifted appropriately to eliminate the oldest distance data in the buffer. Also, the in-the-window flag is turned on (257) to indicate that the last received echo was descriptive of a liquid surface position within the window. The average value calculated is stored at 258 before the WINDOW subroutine terminates by a return 259 to its calling program sequence.

WINDOW SIZE subroutine 117 is depicted in FIG. 19 and commences with decisions (260, 261) about whether the upper window limit is too high and whether the lower window limit is too low, respectively. The upper window limit cannot exceed the top of the tank as determined by the span data described by switch 69. The lower limit of the window cannot be below the upper end of the dead zone associated with measurement transducer 11. If the window upper and lower limits are above or below the maximum and minimum positions, appropriate adjustments are made as indicated at 262 and 263. If the last received echo is found by decision 265 not to be outside the window then existing, then it is decided (266) whether the window is then at its minimum opening. If the answer to decision 266 is "yes," then nothing can be done other than to reset to zero (267) the counter in which the number of successive echoes outside the window is cumulated. On the other hand, if the last received echo is both inside the window and the window is not at a minimum, the window height is shrunk (268) by one increment, the amount of the increment being determined from relevant data contained in the reference data pertinent to the XLS.COS program. The amount by which the window is shrunk by operation 268 can be a constant incremental amount, say ½ inch or it can be an amount which varies depending upon the height of the window at that time and upon the proximity of the liquid surface to the center of that window as described by the last received echo. In other words, if the window is wide open at, say, three feet and the last received echo indicates that the liquid surface is at approximately the middle of that window, i.e., about one and ½ feet from either window limit, it may be appropriate to move the effective positions of the upper and lower window limits by six inches, i.e., to reduce the overall window height by one foot. If the next echo received is descriptive of a liquid surface position in the center of that two foot high window, it may be appropriate to reduce the window position by eight inches.

If the result of decision 265 is that the last received echo is descriptive of a liquid surface position outside the window, the count of echoes outside the window is incremented (270), and a decision (271) is then made as to whether that echo is the fourth echo in a row outside the window. If decision 271 is "no," then no additional action is taken at that time. On the other hand, if the result of decision 271 is that the echo is the fourth or higher echo in sequence outside the window it is then decided (273) whether the window is then at its maximum height. If "yes," nothing can be done at that point but if "no", the window is expanded (274) one standard sigma increment as determined by the program parameters. Upon the occurrence of suitable conditions, the window size subroutine reaches a return 275 to the XLS.COS program.

Other Operations Sequences (FIGS. 20-23)

Figure 20:
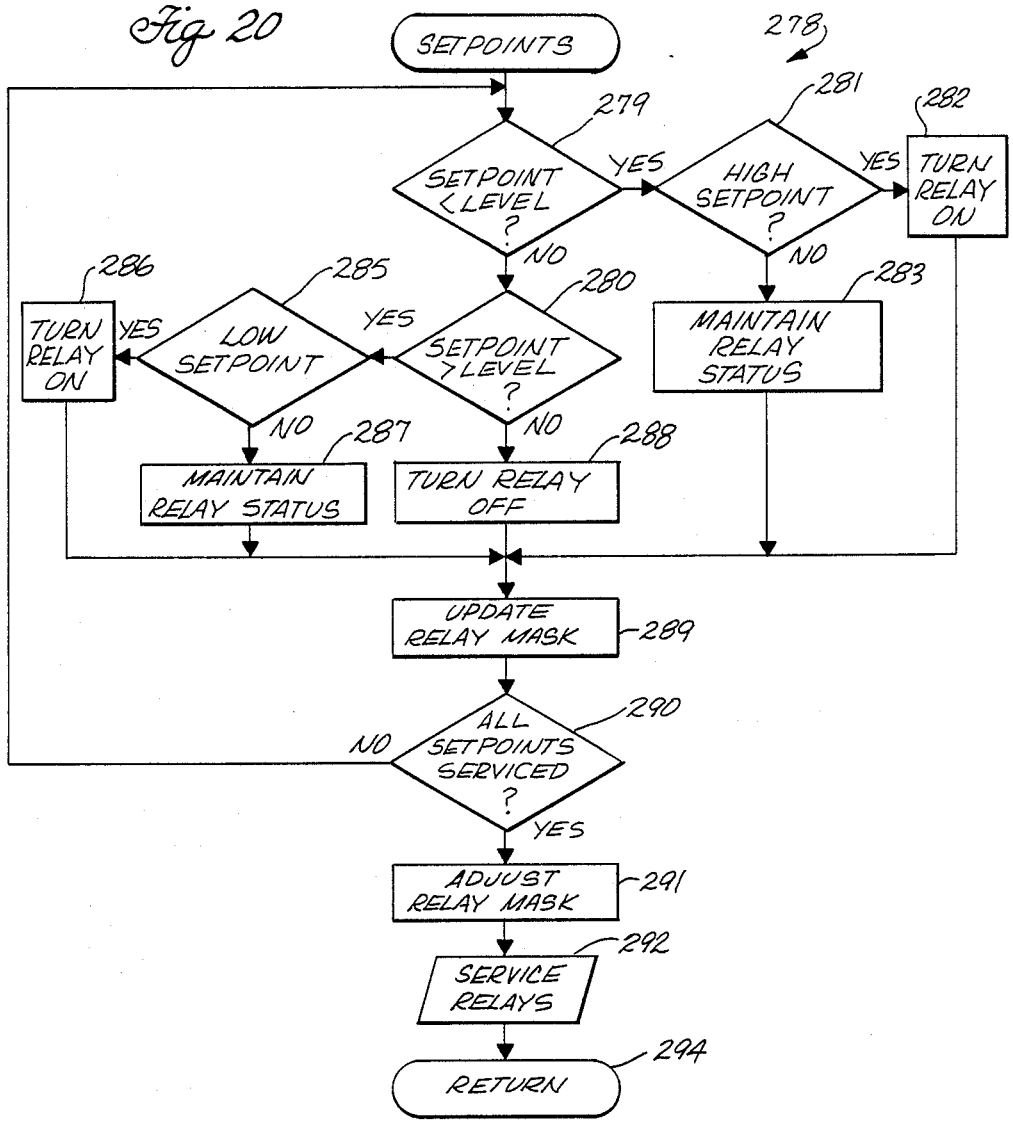
FIGS. 20, 21, 22 and 23 are flow charts of further SETPOINTS, DISPLAY, ANALOG IN, and ANALOG OUT operations sequences which also are subordinate to those shown in FIGS. 8A through 8D.
Figure 21:
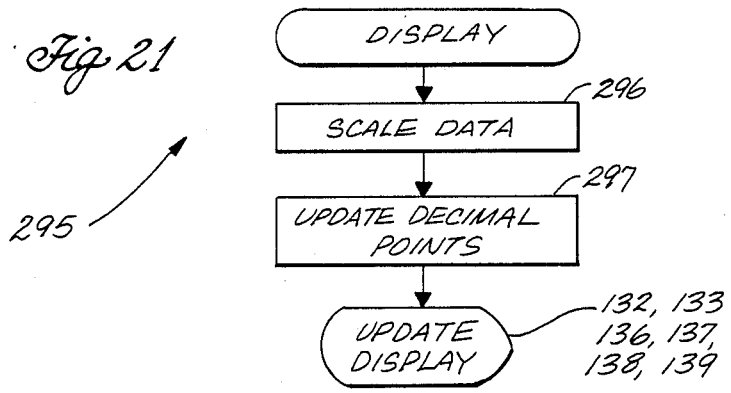
Figure 22:
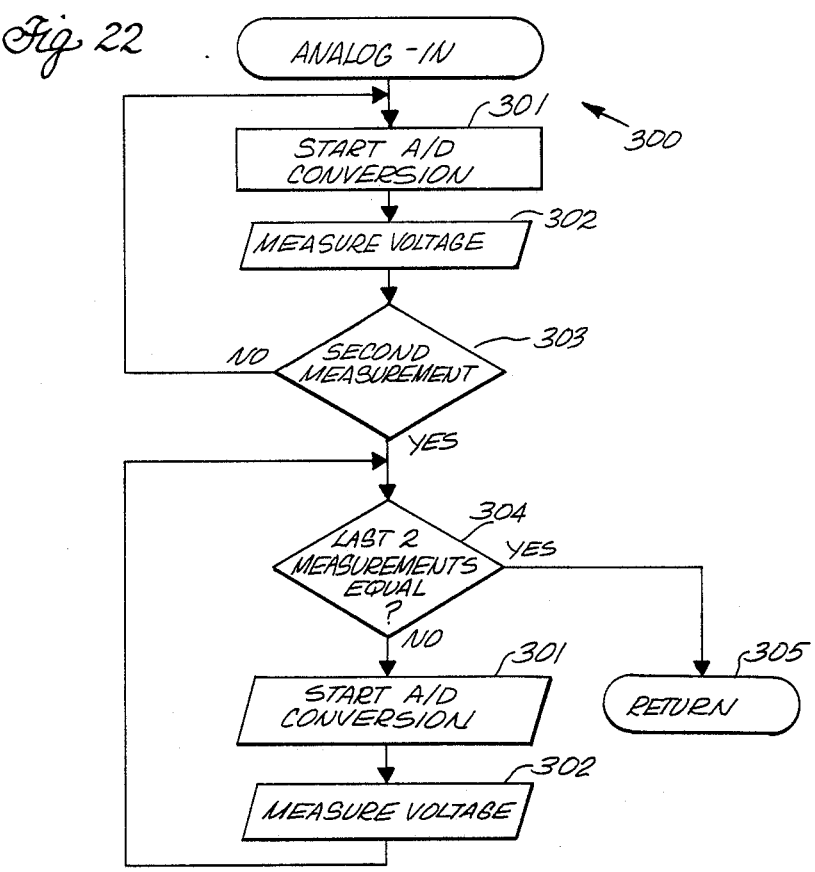

The main XLS.COS program 94 of system 10 includes a SETPOINTS subroutine 278 which is generally described by the flow chart of FIG. 20. In connection with subroutine 278, it will be recalled that control panel 56 includes a plurality of set point relays having associated with them BCD switches 73 through 78 for establishing specified distances or levels, as measured by measurement transducer 11, at which alarm or control actions are to be taken depending upon whether, in each instance, the sensed distance or level has risen past or fallen below the set point value. Accordingly, subroutine 278 makes two related decisions 279 and 280. Decision 279 is whether the relevant set point value describes a liquid level less than the last measured liquid level. If the answer to this determination is that the measured liquid level is higher than the set point level (the set point value is less than the level value), a decision 281 is made as to whether the pertinent set point is a high set point. I.e., is the fact that the pertinent set point level is less than the last measured liquid level position a fact or condition which is to trigger operation of the pertinent relay? If the answer is "yes," then the related relay is turned ON as indicated at 282, but if not, the status of the pertinent relay is maintained as indicated at 283. Decision 280 is the converse of determination 279, namely, whether the pertinent set point level is greater than the last measured liquid level in the tank. If the answer to this determination is "yes," it is then decided (285) whether the condition leading to a "yes" decision at 280 is a condition which requires that the pertinent relay be turned ON. If "yes," the relay is turned ON as indicated at 286, but if not the relay status is maintained as indicated at 287. If pursuant to determinations 279 and 280, it is found that the measured liquid level and the relevant set point level are equal within specified limits, the related relay is turned OFF (288) if it was previously ON.

The actions indicated at 282, 283, 286, 287 and 288 in FIG. 20 are implemented by updating (289) a relay mask as appropriate. The relay mask is a byte of information, i.e., a word of eight binary bits. One bit in the mask byte is assigned to each relay with which a setpoint is associated; eight or less setpoint relays thus are possible in system 10. If the pertinent relay is to be ON, the bit is a "1," and if the relay is to be OFF, the bit is a "0." Updating the relay mask involves causing the pertinent bit in the mask to have the correct value as indicated by actions 282, 286 and 288; actions 283 and 287 produce no change in bit value.

The SETPOINTS routine then decides (290) whether all setpoint relays have had their setpoint values compared against the last measured liquid level. If not, that comparison is made for each setpoint relay in sequence, including updating the corresponding bit of the mask byte. When all necessary comparisons have been made, the format of the relay mask byte is adjusted (291) so that each bit in the byte is in the place corresponding to the related relay number. The adjusted mask byte is then written (sent) to the relay latch 89 which operates to change relay states as needed; this is indicated by operation 292, "service relays." The SETPOINTS routine then returns (294) to the mainline program.

A display subroutine 295 (see FIG. 21) is run each time any of the display operations 132, 133, 136, 137, 138 or 139 (see FIG. 8D) is required. The appropriate value to be displayed is scaled 296 by adjusting the value for the most significant figures which can be displayed consistent with the capacity of display 57 on panel 56. If the relevant information is to be manifested as a percentage, the decimal point position in the data so scaled is updated (297), after which the relevant display operation is performed. In this case, the relevant display operation is either confirming and restating the last recalculated measurement made available at the beginning of the current damping period which is not yet expired or, in the event that a damping period has expired and a recalculated measurement value is available, displaying that recalculated value in appropriate terms whether or not the value so displayed is the same as or different from that previously displayed.

An ANALOG-IN subroutine 300 is included within the programming of system 10. This subroutine is useful in conjunction with the TUNE subroutine 201 as it measures the AGC voltage and converts it to a decimal representation for handling by microprocessor 84. This subroutine requires that at least two measurements be made of the AGC voltage and that two measurements in sequence be equal, otherwise the ANALOG-IN subroutine repeats until it has measured and converted to digital values two consecutive equal voltage measurements. Thus, subroutine 300 commences with a start analog-to-digital conversion command 301; this produces the operation 302 of measuring the relevant AGC voltage. After a measurement has been made, the subroutine decides (303) whether the last measurement was the second of at least two consecutive measurements. If the result of decision 303 is "no," then operations 301 and 302 are repeated; on the other hand, if the result of decision 303 is "yes," then a decision (304) is made about whether the last two measurements so made are equal. If "yes," subroutine 304 then reaches its return 305; if "no," further commands 301 and voltage measurements 302 are performed one or more times until decision 304 is "yes."

Figure 23:
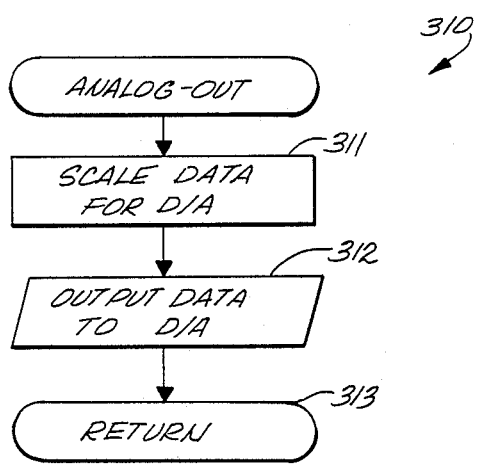

As shown in FIG. 23, the programming for system 10 also includes an ANALOG-OUT subroutine 310 which is used to convert digital information to appropriate analog values (voltages) for presentation to analog output terminals 92. Subroutine 310 is run to process digital data descriptive of the value, variable, or factor which is to be output from circuit 15 via analog output 87 (see FIG. 6). In each instance, subroutine 310 first scales (311) the relevant digital data to the 4–20 milliamps output range and then outputs (312) to the relevant analog output terminal 92 a voltage proportional to the result of the scaling step. For example, if the digital representation of a value or factor to be output at a terminal 92 is zero, then the output voltage applied to the relevant terminal may be 4 milliamps. On the other hand, if the digital representation of the value of interest is at the midpoint of its permissible range, the output to the pertinent terminal 92 may be 12 milliamps analog signal. Subroutine 310 ends with a return 313 to the proper place in the program from which it was called.

SECOND EMBODIMENT (FIG. 24)

Figure 24:
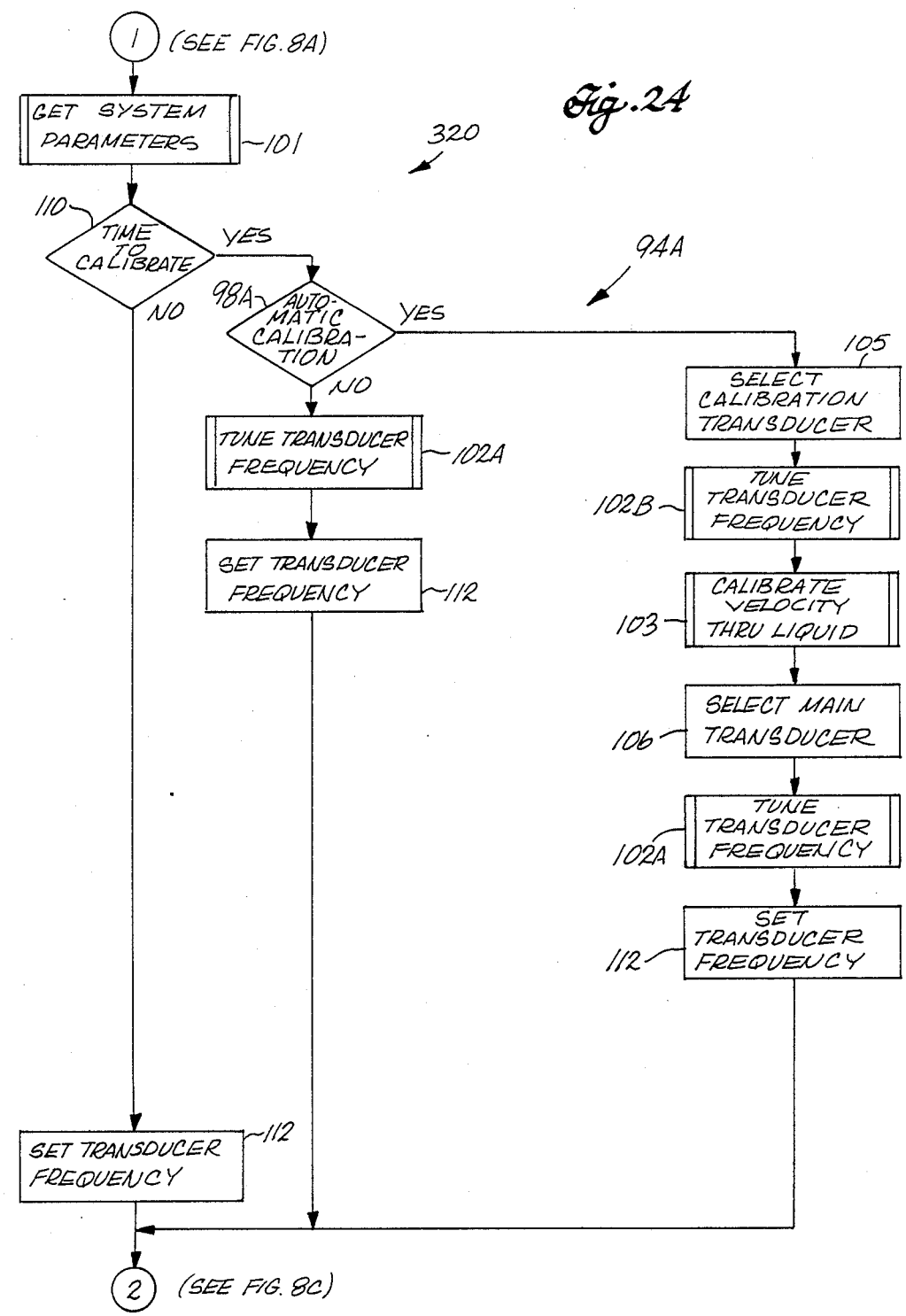
FIG. 24 is a flow chart similar to the flow chart of FIG. 8B and which coordinates with FIGS. 8A, 8C and 8D to describe the functions, and relations between functions, performed during operation of a second embodiment of the invention in which the XLS.COS program includes automatic adjustment, if appropriate, of the operating frequency of each transducer in the system and recalibration, if appropriate, of the speed of sound in the liquid of interest periodically during operation of the system following start-up.

Another nonintrusive liquid level sensing and measuring system 320 according to this invention is illustrated in relevant part in the program flow diagram of FIG. 24. System 320 is like system 10 described above and shown in FIGS. 1-23 except for the manner in which the content of FIG. 24 differs from the content of FIG. 8B. System 320, like system 10, can be provided in one-transducer or two-transducer configurations; both configurations are addressed by the content of FIG. 24.

System 320 differs from system 10 by having the capability, which system 10 as described does not have, of verifying from time to time that the frequency of each signal emitted by each transducer in the system is that frequency which is productive of a maximum amplitude reflection signal (echo), and of adjusting the transducer driving means (transmitter 47) appropriately to change the emitted signal frequency to the frequency productive of a maximum amplitude reflection signal. Accordingly, in system 320, once the main XLS.COS program 94A has completed its initial initialization and calibration subroutine and operation (see FIG. 8A) and has entered its endless operating program loop (see FIGS. 24, 8C and 8D), program 94A for system 320 performs the AUTO TUNE subroutine 102A, or 102A and 102B, for each transducer in the system each time the opportunity arises to verify or recalibrate the sound velocity in the liquid in tank 12, whether or not the system is present in a two-transducer configuration. Thus, in system 320 as shown in FIG. 24, each time program 94A enters its endless loop the program reacquires the system parameters then prevailing as indicated at 101 in FIG. 24. Program 94A then decides (110) whether it is timely to recalibrate the system; if "no", then the operating frequency of measurement transducer 11 is reset (112) at the frequency determined by the relevant then-prevailing system parameter, but if "yes", the program then decides (98A, a decision very much like decision 98) whether the system includes the AUTO CAL feature which involves the presence of calibration transducer 16. If a calibration transducer is not present (a "no" decision at 98A), then program 94A runs (102A) the transducer frequency tuning subroutine (FIG. 12) and sets 112 the frequency of transducer 11 appropriately to assure that transducer 11 receives a maximum amplitude echo signal from liquid surface 14. The program then continues through the remainder of the endless loop illustrated by FIGS. 8C and 8D which have been described above.

However, if the decision at 98A is "yes", i.e., that a calibration transducer 16 is present in system 320, that transducer is selected (105), its frequency is tuned (102B) as needed to that producing a maximum amplitude echo signal and the calibrate subroutine 103 is rerun to confirm the value of or ascertain a new value of the velocity of sound through the liquid in tank 12. Also, thereafter, the vertically directed measurement transducer is selected (106), and its frequency is tuned (102A) to that producing a maximum strength echo from liquid surface 14. The operating frequencies of transducers 11 and 16 are set (112) to reconfirmed or revised values, and then the program continues through the remainder of the loop illustrated by FIGS. 8C and 8D.

In this way, from time to time, at intervals determined by the period between successive recalibration opportunities, all transducers in the system are returned for optimum operating frequency. Intervening causes which could affect transducer operating frequency such as a change in liquid temperature or a change in the nature of the liquid (e.g., frothy), are recognized and adjusted for so that the system operates in the most efficient manner possible until retuning again can occur.

CONCLUSION

In view of the preceding descriptions of the presently preferred embodiment of this invention, which embodiment can be provided in either a single transceiver or a dual transceiver configuration, it is seen that this invention effectively addresses the need identified above and provides the benefits and advantages previously described, as well as other benefits and advantages. It will also be appreciated that the preceding descriptions are illustrative and generally descriptive, not exhaustive of all forms which the present invention may take. The operational sequences other than those embodied in the described principal XLS.COS program, as well as in the subroutines of that program which have been described, can be used and can be depicted by operational flow charts different from those presented in FIGS. 8 through 22. The implementation of the principles of this invention are not dependent upon the use of a particular programming language or particular microprocessor or particular detailed program structure. The described embodiment of the invention includes several features and procedural aspects which need not be used in combination. For example, the AUTO-TUNE and window features of the invention can be used separately from the AUTO-CAL feature in combination with a suitable transceiver. Also, separate acoustic transmitting and receiving transducers can be used, as compared to transceivers which combine the acoustic transmission and reception operations in a single mechanism. For example, separate transmitting and receiving acoustic transducers can be mounted closely adjacent each other on a bottom exterior surface of tank 12 in place of measurement transceiver 1 and can be coupled separately to transmitter 47 and receiver 48. Similarly, separate acoustic transmitting and receiving transducers can be used on one side wall of tank 12 in place of calibration transceiver 16; alternatively, separate transmitting and receiving transducers can be mounted to the outer surfaces of opposite side walls of tank 12 in place of calibration transceiver 16 for measurement of the time for sound to travel once across the tank through the liquid, rather than across the tank and back as an echo. Accordingly, the preceding description should not be read as limiting this invention to the specific structural organizations or the specific procedural operations and sequences which have been described.

What is claimed is:

1. Apparatus for measuring in selected terms the level of a liquid in a tank and the like from a location outside the tank and at the bottom thereof, the apparatus comprising energy transmitting means mountable to the bottom of a tank adapted to contain a liquid for transmitting an emitted signal in a selected liquid-surface-reflectable form of energy essentially vertically through a bottom tank wall and through a liquid in the tank to the surface of the liquid in the tank, energy receiving means mountable to the bottom of the tank for receiving a reflection of transmitted energy from the liquid surface and for generating a reflection signal in response to receipt of a reflection, driving means for the transmitting means operable for driving the transmitting means to transmit an emitted signal, signal processing means for the receiving means for processing a reflection signal to create information descriptive in said selected terms of the location of the surface of the liquid in the tank, and tuning means responsive to operation of the signal processing means and operable for adjusting a selected property of the emitted signal to an optimum value for the liquid in the tank.

2. Apparatus according to claim 1 wherein the selected terms are the absolute distance of the liquid level above the tank bottom.

3. Apparatus according to claim 1 wherein the selected terms are the distance of the liquid level above the tank bottom as a percentage of a selected full condition of the tank.

4. Apparatus according to claim 1 wherein the transmitting means and the receiving means comprise transceiving means.

5. Apparatus according to claim 4 wherein the transceiving means comprises a housing having therein a cavity which is open to an end of the housing, the housing is mountable to a tank exterior surface with the cavity opening toward the surface, a piezoelectric crystal assembly disposed in the cavity for movement toward the cavity opening, and force means coupled between the housing and the assembly for forcibly biasing the assembly to an extended position in which the assembly projects beyond the cavity opening, whereby the force means causes the assembly to forcibly contact the tank surface upon mounting of the housing to the tank surface.

6. Apparatus according to claim 1 wherein the selected property of the emitted signal is frequency, and the tuning means is operable for altering the frequency of the emitted signal.

7. Apparatus according to claim 6 wherein the selected form of energy is acoustic energy.

8. Apparatus according to claim 7 wherein the transmitting means comprises a piezoelectric device.

9. Apparatus according to claim 8 wherein the driving means is operable to cause the transmitting means to transmit an emitted signal at any one of several different frequencies within a range of frequencies, the tuning means is coupled to the driving means, and the tuning means is operable for causing the driving means to drive the transmitting means to transmit plural emitted signals each having a different frequency, for evaluating the amplitude of the reflection signal related to each emitted signal, and for identifying the reflection signal having the greatest amplitude.

10. Apparatus according to claim 9 wherein the tuning means includes means operable from time to time for verifying that the frequency of the emitted signal is productive of a maximum amplitude reflection signal and for causing the driving means to change the emitted signal frequency as appropriate.

11. Apparatus according to claim 9 wherein the range of frequencies comprises a plurality of primary frequencies at substantially regular larger intervals through the range of frequencies and a plurality of secondary frequencies at substantially regular smaller intervals through the range, and the tuning means is operable for causing the transmitting means to transmit emitted signals at at least some of the primary frequencies and to identify therefrom a primary frequency productive of an apparent peak reflection signal amplitude, and for causing the transmitting means to transmit emitted signals at at least some of the secondary frequencies within a portion of the range associated with the identified primary frequency and to identify a frequency of emitted signal productive of a confirmed maximum reflection signal amplitude.

12. Apparatus according to claim 1 wherein the signal processing means includes discriminating means for creating liquid level descriptive information only from reflection signals associated with the liquid surface in the tank.

13. Apparatus according to claim 12 wherein the discriminating means includes means for determining the location of the liquid surface in the tank, for defining a selected distance range extending above and below said location, and for accepting for creation of said information only reflection signals originating within the distance range.

14. Apparatus according to claim 13 wherein the discriminating means includes means for averaging the information created from a selected number of successive reflection signals and for redetermining the location of the liquid surface based on the average.

15. Apparatus according to claim 14 wherein the discriminating means includes range adjusting means for detecting the presence or absence of an acceptable reflection signal for each emitted signal, for increasing the distance range in response to the detection of a selected number of absences until the next acceptable reflection signal is detected, and for using the information created in respect to said next acceptable reflection signal to redetermine the location of the liquid surface in the tank.

16. Apparatus according to claim 14 wherein the range adjusting means includes means responsive to detection of said selected number of presences of acceptable reflection signals for reducing the distance range toward a minimum distance range.

17. Apparatus according to claim 16 wherein the range adjusting means is operable for increasing and reducing the distance range in increments away from and toward the minimum distance range.

18. Apparatus according to claim 16 wherein the range adjusting means is operable for reducing the distance range in response to detection of the selected number of presences in succession.

19. Apparatus according to claim 18 wherein range adjusting means is operable for reducing the range in increments which vary in magnitude depending upon the extent of the range and the relation of the determined surface location to the range.

20. Apparatus according to claim 1 wherein the signal processing means includes memory means for storing data descriptive of a distance, and means for entering such data into the memory means.

21. Apparatus according to claim 20 wherein the means for entering the distance data includes manually operable means.

22. Apparatus according to claim 20 including transceiving means for transmitting and receiving said form of energy, the transceiving means is mountable to the exterior of a side wall of the tank for transmitting said form of energy along a selected path through the side wall and liquid in the tank to an opposite side wall, and for generating a separate reflection signal in response to receipt of a reflection of transmitted energy from the opposite side wall, and means for entering into the memory means data descriptive of the distance along the selected path between the tank side walls.

23. Apparatus according to claim 20 wherein the signal processing means includes means for describing the velocity of said form of energy through the tank and liquid therein over said distance by determining the time required for said form of energy to move said distance through the tank wall and said liquid, and by dividing said distance by said time.

24. Apparatus according to claim 23 wherein the distance is a known depth of liquid in the tank.

25. Apparatus according to claim 23 wherein the distance is the distance horizontally between opposite side wall locations on the tank, and including a second energy transmitting means mountable to an exterior side wall of the tank for transmitting an emitted signal in said energy form along a selected path through the wall and through liquid in the tank to the opposite side wall and a second energy receiving means mountable to the tank exterior essentially along said path for generating a signal in response to receipt of said energy form.

26. Apparatus according to claim 25 wherein the second transmitting and receiving means are mountable to the same side wall of the tank proximate each other for receipt by the second receiving means of a reflection from the opposite tank side wall of a signal emitted along the path by the second transmitting means.

27. Apparatus according to claim 26 wherein the second transmitting and receiving means comprise a transceiver.

28. A method for determining the location in a tank of the surface of a quantity of liquid in the tank from a position outside the tank, the method comprising the steps of
 (a) directing a pulse of sound energy essentially vertically through a bottom wall of the tank and through liquid in the tank from a selected place on the bottom of the tank,
 (b) receiving at substantially the same place on the tank bottom an echo of a sound energy pulse from the liquid surface and generating an echo signal in response thereto,
 (c) determining from the echo signals associated with a series of sound pulses of differing frequency an optimum frequency of sound pulse for use with the liquid in the tank and thereafter performing directing step (a) with pulses of said optimum frequency,
 (d) ascertaining the velocity of sound through liquid in the tank and through the tank wall,
 (e) measuring the time between direction of a sound pulse into the tank and the liquid and receipt of an echo of the pulse from the liquid surface,
 (f) computing the distance of the liquid surface above said place on the bottom of the tank, and
 (g) developing a representation of the computed distance.

29. The method according to claim 28 wherein performance of the step (c) of claim 28 includes
 (h) defining a range of frequencies at which sound can be directed through the tank and into liquid in the tank,
 (i) defining a plurality of first frequencies at relatively large intervals over the range and a plurality of second frequencies at relatively small steps over each interval,
 (j) for each first frequency generating an echo signal in response to direction of a sound pulse of that frequency and receipt of an echo thereof, and identifying at least one first frequency productive of an echo signal of greatest amplitude, and
 (k) for each second frequency in the intervals adjacent said identified first frequency generating an echo signal, and identifying the frequency productive of the echo signal of highest amplitude as the optimum frequency.

30. The method according to claim 28 wherein performance of step (d) of claim 28 includes measuring the time required for a sound pulse to travel through a tank wall and through liquid in the tank over a known distance.

31. The method according to claim 30 wherein the known distance is known by manual measurement of the distance from said place to the liquid surface.

32. The method according to claim 30 wherein the known distance is a distance across the tank along a selected path between opposite sides of the tank.

33. The method according to claim 32 including periodically reascertaining the velocity of sound through the tank wall and through liquid in the tank.

34. The method according to claim 28 including, in practice of the measuring step, eliminating from consideration for generation of an echo signal echoes of sound energy pulses from locations in the tank other than the liquid surface.

35. The method according to claim 34 wherein the elimination process includes determining the location in the tank of the liquid surface, establishing a distance range spanning the liquid surface location from within which sound echoes are acceptable as emanating from the liquid surface and from outside which sound echoes are not so acceptable, and testing each sound echo received for emanation from a source within the established range.

36. The method according to claim 35 including determining the location in the tank of the liquid surface from an average of a selected number of said computed distances.

37. The method according to claim 35 including increasing the distance range in the event a selected number of consecutive sound pulses do not produce a sound echo emanating from within a previously established range.

38. The method according to claim 37 including further increasing the distance range for each additional consecutive sound pulse not productive of a sound echo from within the last previously established range until a sound echo is received from within the increased range or until the range is at a maximum value.

39. The method according to claim 35 including defining a minimum value of the distance range and, in the event the established range is greater than the minimum value thereof, reducing the range by a selected amount upon receipt of a sound echo from a source within the established range.

40. The method according to claim 39 including defining the amount of range reduction dependent upon the amount by which the range distance exceeds the minimum value thereof.

41. A method for determining the location in a tank of the surface of a quantity of liquid in the tank, the method comprising the steps of
 (a) directing pulses of sound energy form a source thereof in an essentially vertical direction toward a liquid surface in the tank and detecting substantially at said source echoes of the pulses from the liquid surface, (b) for each pulse, measuring the time between direction of the pulse and the detection of the echo thereof,
(c) providing information about the speed at which sound travels from the sound pulse source to the liquid surface,
(d) using said information and the time measurements to determine the distance from the sound pulse source to the liquid surface, thereby to determine the location of the liquid surface, and
(e) for subsequent sound pulses, disregarding for determination of source-to-surface distance any sound pulse echo which does not have an origin within a defined range of distances above and below the liquid surface.

42. The method according to claim 41 including redefining the range distance upwardly or downwardly dependent upon a given sound pulse echo having an origin respectively outside or inside the last defined range.

43. The method according to claim 42 including redefining the range distance upwardly to a greater distance toward a maximum thereof upon the occurrence of a predetermined number of consecutive sound pulses not having associated with them echos with origins within the last defined range.

44. The method according to claim 42 including redefining the range distance downwardly to a lesser distance toward a minimum thereof upon the occurrence of a predetermined number of consecutive sound pulses having associated with them echos with origins within the last defined range.

* * * * *